(12) United States Patent (10) Patent No.: US 12,664,692 B2
Hirao (45) Date of Patent: Jun. 23, 2026

(54) IMAGE PROCESSING DEVICE AND METHOD

(71) Applicant: Sony Semiconductor Solutions Corporation, Kanagawa (JP)

(72) Inventor: Hidetomo Hirao, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 259 days.

(21) Appl. No.: 18/562,592

(22) PCT Filed: Feb. 22, 2022

(86) PCT No.: PCT/JP2022/007087
§ 371 (c)(1),
(2) Date: Nov. 20, 2023

(87) PCT Pub. No.: WO2023/281801
PCT Pub. Date: Jan. 12, 2023

(65) Prior Publication Data
US 2025/0200808 A1 Jun. 19, 2025

(30) Foreign Application Priority Data

Jul. 5, 2021 (JP) ................................. 2021-111545

(51) Int. Cl.
*G06V 10/00* (2022.01)
*G06T 9/00* (2006.01)
*G06V 10/14* (2022.01)

(52) U.S. Cl.
CPC ................ *G06T 9/00* (2013.01); *G06V 10/14* (2022.01)

(58) Field of Classification Search
CPC .... H04N 19/88; H04N 19/154; H04N 19/186;
H04N 19/50; H04N 23/12; H04N 19/593;
(Continued)

(56) References Cited

U.S. PATENT DOCUMENTS

| | | | | | |
|---|---|---|---|---|---|
| 8,233,544 | B2 * | 7/2012 | Bao | ......................... | H04N 19/34 |
| | | | | | 375/240.18 |
| 8,824,813 | B2 * | 9/2014 | Sasaki | .................. | H04N 19/196 |
| | | | | | 382/233 |

(Continued)

FOREIGN PATENT DOCUMENTS

| | | |
|---|---|---|
| JP | 2003125209 A | 4/2003 |
| WO | 2017081925 A1 | 5/2017 |
| WO | 2018150683 A1 | 8/2018 |

OTHER PUBLICATIONS

International Search Report (PCT/ISA/210), International Application No. PCT/JP2022/007087, dated Apr. 26, 2022.

*Primary Examiner* — Amir Alavi
(74) *Attorney, Agent, or Firm* — Michael Best & Friedrich LLP

(57) ABSTRACT

The present disclosure relates to an image processing device and method capable of suppressing a drop in encoding efficiency.
By reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, a polarization angle characteristic reconfiguration image constituted by pixel values of the pixels that have detected the incident light for which characteristic values of at least the polarization angle characteristic are the same is generated; and the generated polarization angle characteristic reconfiguration image is encoded. The present disclosure can be applied to, for example, an image processing device, an encoding device, a decoding device, an electronic device, an image processing method, a program, or the like.

14 Claims, 27 Drawing Sheets

(58) Field of Classification Search
    CPC .. G01J 4/04; G01J 3/0224; G06T 9/00; G06V
    10/82; G06V 10/14
    See application file for complete search history.

(56)                    References Cited

U.S. PATENT DOCUMENTS

| | | | | |
|---|---|---|---|---|
| 9,357,237 | B2 * | 5/2016 | Eslami | H04N 19/13 |
| 9,591,329 | B2 * | 3/2017 | Kondo | H04N 19/159 |
| 9,818,422 | B2 * | 11/2017 | Rose | H04N 19/30 |
| 10,349,053 | B2 * | 7/2019 | Tanaka | H04N 19/61 |
| 10,701,354 | B2 * | 6/2020 | Nakagami | H04N 19/436 |
| 10,791,335 | B2 * | 9/2020 | Kim | H04N 19/463 |
| 11,979,587 | B2 * | 5/2024 | Pedzisz | H04N 19/13 |
| 2016/0269694 | A1 * | 9/2016 | Masuda | H04N 25/134 |
| 2021/0014530 | A1 * | 1/2021 | Ando | H04N 19/593 |
| 2025/0200808 | A1 * | 6/2025 | Hirao | G01J 3/0224 |

* cited by examiner

Fig. 3

| No. | Description |
|---|---|
| 1 | RECONFIGURE IMAGE ACCORDING TO POLARIZATION ANGLE |
| 1-1 | RECONFIGURE RAW IMAGE ACCORDING TO OPTICAL CHARACTERISTIC, PARAMETERS INCLUDING AT LEAST POLARIZATION ANGLE CHARACTERISTIC, ENCODE |
| 1-1-1 | OPTICAL CHARACTERISTIC PARAMETERS FURTHER INCLUDE TRANSMISSION WAVELENGTH CHARACTERISTIC |
| 1-1-1-1 | PERFORM RECONFIGURATION ACCORDING TO TRANSMISSION WAVELENGTH CHARACTERISTIC, PERFORM RECONFIGURATION ACCORDING TO POLARIZATION ANGLE CHARACTERISTIC |
| 1-1-1-2 | ALIGN RECONFIGURED IMAGES SUCH THAT SAME CHARACTERISTIC VALUES ARE CONTINUOUS FOR TRANSMISSION WAVELENGTH CHARACTERISTIC |
| 1-1-1-3 | APPLY PREDICTION THAT UTILIZES CORRELATION BETWEEN PIXELS OR BETWEEN IMAGES, ENCODE |
| 1-2 | DECODE ENCODED DATA AND PERFORM DEVELOPMENT PROCESSING ON POLARIZATION ANGLE CHARACTERISTIC RECONFIGURATION IMAGE |
| 1-2-1 | OPTICAL CHARACTERISTIC PARAMETERS FURTHER INCLUDE TRANSMISSION WAVELENGTH CHARACTERISTIC |
| 1-2-1-1 | RECONFIGURE ACCORDING TO POLARIZATION ANGLE CHARACTERISTIC |
| 1-2-2 | PERFORM IMAGE PROCESSING |
| 1-2-2-1 | PERFORM NOISE REDUCTION PROCESSING |
| 1-2-2-2 | ENLARGE OR REDUCE |

Fig. 13

| 2 | RECONFIGURE IMAGE ACCORDING TO TRANSMISSION WAVELENGTH CHARACTERISTIC AND GRID POINTS |
| 2-1 | RECONFIGURE RAW IMAGE ACCORDING TO TRANSMISSION WAVELENGTH CHARACTERISTIC AND GRID POINTS, ENCODE |
| 2-1-1 | ALIGN RECONFIGURED IMAGES SUCH THAT SAME CHARACTERISTIC VALUES ARE CONTINUOUS FOR TRANSMISSION WAVELENGTH CHARACTERISTIC |
| 2-1-2 | APPLY PREDICTION THAT UTILIZES CORRELATION BETWEEN PIXELS OR BETWEEN IMAGES, ENCODE |
| 2-2 | DECODE ENCODED DATA AND PERFORM DEVELOPMENT PROCESSING ON TRANSMISSION WAVELENGTH CHARACTERISTIC-GRID POINT RECONFIGURATION IMAGE |
| 2-2-1 | PERFORM IMAGE PROCESSING |
| 2-2-1-1 | PERFORM NOISE REDUCTION PROCESSING |
| 2-2-1-2 | ENLARGE OR REDUCE |
| 2-2-2 | PERFORM WAVELENGTH EXPANSION PROCESSING |

| 3 | RECONFIGURE IMAGE ACCORDING TO INTRA-BLOCK POSITIONS |
|---|---|
| 3-1 | RECONFIGURE RAW IMAGE ACCORDING TO INTRA-BLOCK POSITIONS, ENCODE |
| 3-1-1 | ALIGN RECONFIGURED IMAGES SUCH THAT SAME CHARACTERISTIC VALUES ARE CONTINUOUS FOR LIGHT RECEPTION SENSITIVITY CHARACTERISTIC |
| 3-1-2 | APPLY PREDICTION THAT UTILIZES CORRELATION BETWEEN PIXELS OR BETWEEN IMAGES, ENCODE |
| 3-2 | DECODE ENCODED DATA, PERFORM DEVELOPMENT PROCESSING ON INTRA-BLOCK POSITION RECONFIGURATION IMAGE |
| 3-2-1 | PERFORM IMAGE PROCESSING |
| 3-2-1-1 | PERFORM NOISE REDUCTION PROCESSING |
| 3-2-1-2 | ENLARGE OR REDUCE |
| 3-2-2 | PERFORM FOCUS PROCESSING |

Fig. 24

IMAGE PROCESSING DEVICE AND METHOD

TECHNICAL FIELD

The present disclosure relates to an image processing device and method, and particularly relates to an image processing device and method capable of suppressing a drop in encoding efficiency.

BACKGROUND ART

Conventionally, there is a camera system that transmits RAW images output from an image sensor to an image processing Large Scale Integration (LSI) circuit and performs development processing, image processing, and the like. In recent years, as semiconductor manufacturing technology and sensor configuration technology has improved, image sensors used in camera systems have advanced in terms of increased resolutions, higher framerates, higher dynamic ranges, and the like, and the amounts of data in RAW images output from image sensors have increased as well.

Accordingly, methods for encoding (compressing) RAW images and transmitting the compressed images to an image processing LSI circuit have been considered. In this RAW image encoding, applying an encoding method that uses prediction by utilizing correlation within an image (among pixels), correlation among images, and the like, such as Joint Photographic Experts Group (JPEG), Moving Picture Experts Group (MPEG), Advanced Video Coding (AVC), High Efficiency Video Coding (HEVC), Versatile Video Coding (VVC), or the like, makes it possible to further suppress a drop in encoding efficiency.

A method of separating a RAW image into R, G, and B colors of a color filter and encoding an image for each color has also been considered (see PTL 1, for example). This makes it possible to improve the prediction accuracy within the image (among the pixels), which in turn makes it possible to further suppress a drop in the encoding efficiency.

Incidentally, in recent years, a polarization sensor has been developed which detects incident light to which a polarization angle has been applied by a polarization filter. The polarization filter is a filter that transmits only light having a predetermined polarization angle. In other words, the light transmitted by the polarization filter is applied with the polarization angle of the filter as an optical characteristic. The polarization filter can set the applied polarization angle on a pixel-by-pixel basis. For example, the polarization filter can apply a plurality of types of polarization angles as optical characteristics for incident light of the entire pixel array of the polarization sensor. In other words, the polarization filter can apply any of a plurality of types of polarization angles as optical characteristics for incident light on each pixel of the pixel array.

Citation List

Patent Literature

[PTL 1]
    JP 2003-125209A

SUMMARY

Technical Problem

However, with the method described in PTL 1, it has been difficult to separate RAW images according to the polarization angle applied to the incident light. In other words, there has been a risk that pixel values of incident light to which mutually-different types of polarization angles have been applied will be included within each image of a given color. As a result, when encoding the image of each color, there is a risk that the prediction accuracy within the image (among the pixels) will drop, and the encoding efficiency will drop as a result.

Having been conceived in light of such a situation, the present disclosure makes it possible to suppress a drop in subjective image quality while suppressing a drop in encoding efficiency.

Solution to Problem

An image processing device according to one aspect of the present technique is an image processing device that includes: a reconfiguring unit that, by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, generates a polarization angle characteristic reconfiguration image constituted by pixel values of the pixels that have detected the incident light for which characteristic values of at least the polarization angle characteristic are the same; and an encoding unit that encodes the polarization angle characteristic reconfiguration image.

An image processing method according to one aspect of the present technique is an image processing method that includes: generating, by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, a polarization angle characteristic reconfiguration image constituted by pixel values of the pixels that have detected the incident light for which characteristic values of at least the polarization angle characteristic are the same; and encoding the polarization angle characteristic reconfiguration image generated.

An image processing device according to another aspect of the present technique is an image processing device that includes: a decoding unit that, by decoding encoded data, generates a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and a development processing unit that performs development processing on the polarization angle characteristic reconfiguration image.

An image processing method according to another aspect of the present technique is an image processing method that includes: generating, by decoding encoded data, a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and performing development processing on the polarization angle characteristic reconfiguration image generated.

For example, in an image processing device and method according to one aspect of the present technique, by reconfiguring a RAW image that is an output of a sensor having a pixel array constituted by a plurality of types of pixels each detecting incident light having different optical characteristics including at least a polarization angle characteristic, according to the optical characteristics including at least the polarization angle characteristic of the incident light, a polarization angle characteristic reconfiguration image constituted by pixel values of the pixels that have detected the incident light for which characteristic values of at least the polarization angle characteristic are the same is generated; and the polarization angle characteristic reconfiguration image that has been generated is then encoded.

For example, in an image processing device and method according to another aspect of the present technique, by decoding encoded data, a polarization angle characteristic reconfiguration image is generated, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and development processing is performed on the polarization angle characteristic reconfiguration image generated.

BRIEF DESCRIPTION OF DRAWINGS

FIG. 3 is a diagram illustrating an example of reconfiguring an image using a polarization angle.

FIG. 13 is a diagram illustrating an example of reconfiguring an image using a transmission wavelength characteristic and grid points.

FIG. 17 is a block diagram illustrating an example of the main configuration of a multispectral image sensor unit.

FIG. 21 is a diagram illustrating an example of reconfiguring an image according to intra-block positions.

FIG. 24 is a block diagram illustrating an example of the main configuration example of an image plane phase detection AF image sensor unit.

DESCRIPTION OF EMBODIMENTS

Hereinafter, modes for carrying out the present disclosure (hereinafter referred to as embodiments) will be described. The descriptions will be given in the following order.

1. Transmission of RAW Images
2. First Embodiment (Reconfiguration of Image According to Polarization Angle Characteristic)
3. Second Embodiment (Multispectral Image Sensor)
4. Third Embodiment (Image Plane Phase Detection AF Image Sensor)
5. Combinations
6. Supplement

1. Transmission of RAW Images

Documents that Support Technical Content and Terms

The scope disclosed in the present technique is not limited to the content described in the embodiments and also includes the content described in the following non-patent literature and the like that were known at the time of filing, the content of other literature referred to in the following non-patent literature, and the like.

[PTL 1]

(see above)

[NPL 1]

TELECOMMUNICATION STANDARDIZATION SECTOR OF ITU, "Versatile video coding", SERIES H: AUDIOVISUAL AND MULTIMEDIA SYSTEMS Infrastructure of audiovisual services-Coding of moving video, Recommendation ITU-T H.266, August 2020

[NPL 2]

Recommendation ITU-T H.264 (April 2017) "Advanced video coding for generic audiovisual services", April 2017

[NPL 3]

Recommendation ITU-T H.265 (February 2018) "High efficiency video coding", February 2018

In other words, the content of the non-patent literature and the content of other literature referred to in the non-patent literature described above are also grounds for determining support requirements.

<RAW Image Processing System>

Figure 1:
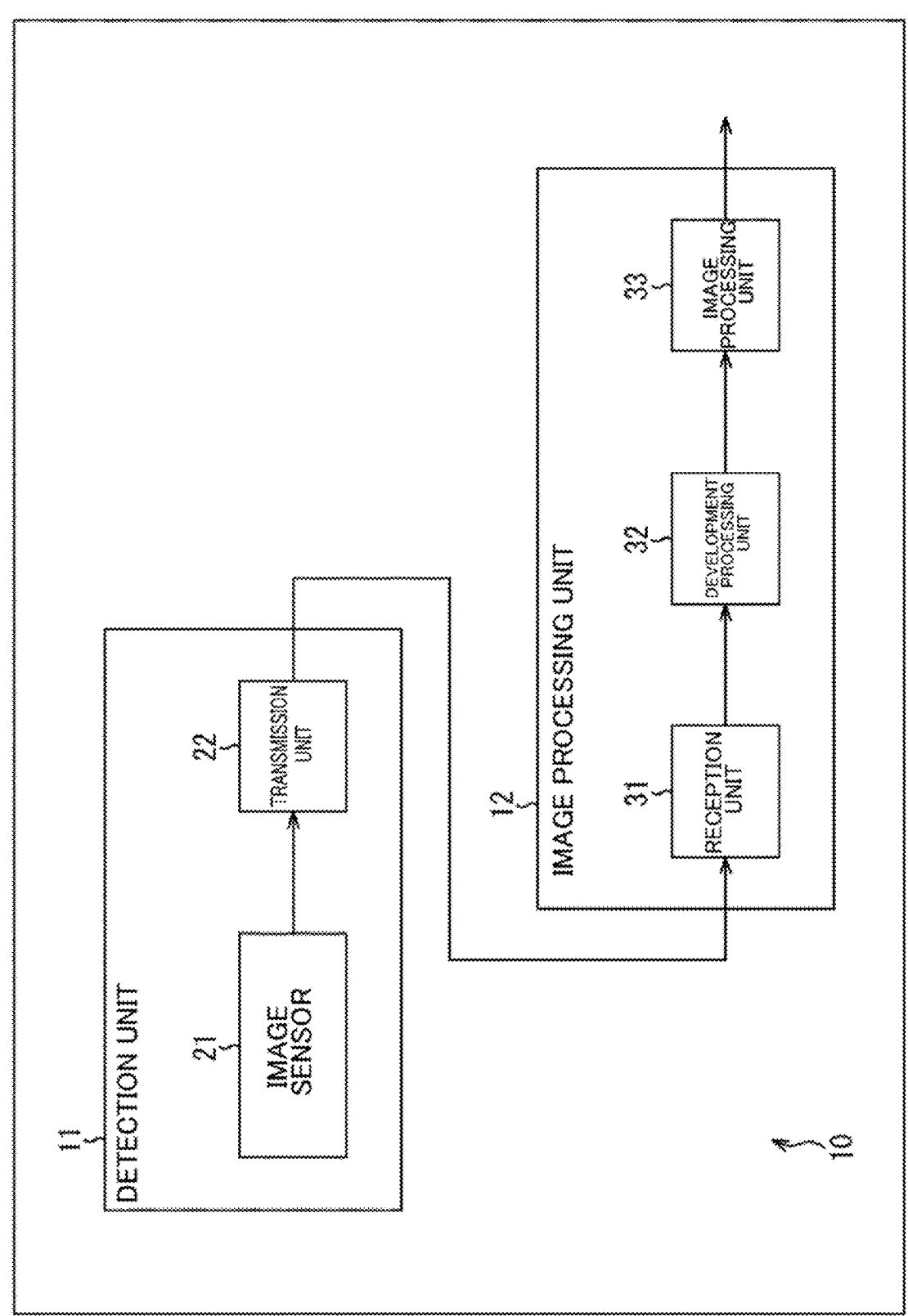
FIG. 1 is a diagram illustrating an example of the transmission of a RAW image.

Conventionally, there is a camera system that transmits RAW images output from an image sensor to an image processing Large Scale Integration (LSI) circuit and performs development processing, image processing, and the like, such as that illustrated in FIG. 1, for example. In a camera system 10 illustrated in FIG. 1, a transmission unit 22 transmits a RAW image, output from an image sensor 21, from a detection unit 11 to an image processing unit 12. A reception unit 31 obtains the RAW image. A development processing unit 32 performs development processing on the obtained RAW image. An image processing unit 33 performs predetermined image processing on the image after the development processing (also called a "post-development image").

In recent years, as semiconductor manufacturing technology and sensor configuration technology has improved, image sensors used in camera systems have advanced in terms of increased resolutions, higher framerates, higher dynamic ranges, and the like, and the amounts of data in RAW images output from image sensors have increased as well.

For example, image sensors have increased in resolution as semiconductor manufacturing technology and sensor configuration technology has improved, and sensors with tens of millions to more than 100 million pixels per image are also being used. In addition, when used, for example, to shoot and record moving images, the image sensor captures and outputs such high-resolution images at a rate of tens to hundreds of images every second. Accordingly, the amount of data processed per unit of time increases in proportion to the framerate. In addition, due to the spread of devices that handle high dynamic range color spaces, the dynamic range per pixel has increased, for example, from 12 bits to 14 bits.

As described above, the amount of data handled by the image sensor and the camera system that processes the image data is increasing. As a result, there has been a risk of the power consumed by each device in the data processing path, such as the image sensors, image processing LSI circuits, display devices, and the like, increasing. This is one of the major issues in designing and implementing products that include camera systems.

In addition, high-speed transmission of large amounts of data between independent devices, such as image sensors and image processing LSI circuits, places severe constraints on timing latency and wiring layouts from the standpoint of design and implementation of electronic circuit hardware.

This has made the design of interface circuitry and mounting boards for each device difficult, leading to a rise in development and manufacturing costs. In addition, electromagnetic noise induction that causes peripheral devices to malfunction has also become pronounced, forcing manufacturers to take various measures in their products and leading to a rise in manufacturing costs.

Figure 2:
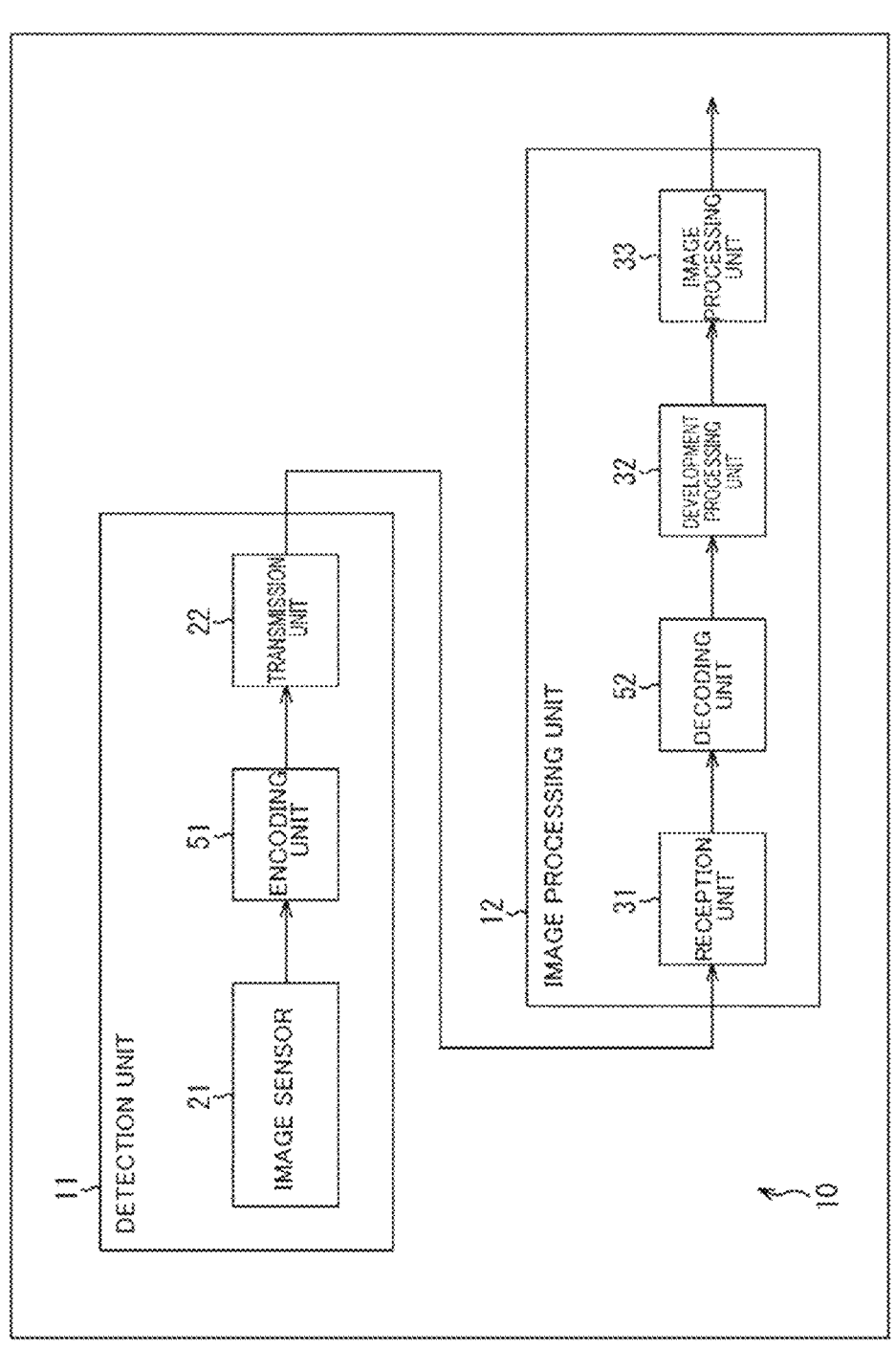
FIG. 2 is a diagram illustrating an example of the encoding and transmission of a RAW image.

Accordingly, methods for encoding (compressing) RAW images and transmitting the compressed images to an image processing LSI circuit have been considered. For example, as illustrated in FIG. 2, an encoding unit 51 encodes (compresses) a RAW image output from an image sensor 21. A transmission unit 22 transmits encoded data of the RAW image, generated by the encoding unit 51, from a detection unit 11 to an image processing unit 12. A reception unit 31 obtains the encoded data. A decoding unit 52 decodes the obtained encoded data and generates (restores) the RAW image. A development processing unit 32 performs development processing on the generated (restored) RAW image. An image processing unit 33 performs predetermined image processing on the image after the development processing (also called a "post-development image").

Encoding the RAW image at the time of transmission in this manner makes it possible to suppress the transmission data rate between devices and to suppress problems caused by transmitting large amounts of data at high speeds between devices. Note that in this RAW image encoding, applying an encoding method that uses prediction by utilizing correlation within an image (among pixels), correlation among images, and the like, such as Joint Photographic Experts Group (JPEG), Moving Picture Experts Group (MPEG), Advanced Video Coding (AVC), High Efficiency Video Coding (HEVC), Versatile Video Coding (VVC), or the like, makes it possible to further suppress a drop in encoding efficiency.

For example, in the case of a color image sensor, a color filter is provided on the pixel array, and pixel values in the red (R) wavelength band, pixel values in the green (G) wavelength band, and pixel values in the blue (B) wavelength band are obtained. The color filter transmits incident light on each pixel of the pixel array, while limiting the wavelength band thereof. This wavelength band is set for each pixel. In other words, the color filter is constituted by one pixel's worth of a filter that transmits the red (R) wavelength band, one pixel's worth of a filter that transmits the green (G) wavelength band, and one pixel's worth of a filter that transmits the blue (B) wavelength band, arranged as an array having a predetermined arrangement pattern.

Accordingly, for example, in a pixel provided with a filter that transmits the red (R) wavelength band, incident light in the red (R) wavelength band is detected, and a pixel value in the red (R) wavelength band is obtained. Likewise, in a pixel provided with a filter that transmits the green (G) wavelength band, incident light in the green (G) wavelength band is detected, and a pixel value in the green (G) wavelength band is obtained. Furthermore, in a pixel provided with a filter that transmits the blue (B) wavelength band, incident light in the blue (B) wavelength band is detected, and a pixel value in the blue (B) wavelength band is obtained.

For example, if the filters in each wavelength band are arranged in a Bayer array pattern, a RAW image output from the color image sensor is constituted by pixel values in each wavelength band distributed in a pattern corresponding to the Bayer array. For example, in the case of a Bayer array, the RAW image is constituted by a row in which pixel values in the red (R) wavelength band and pixel values in the green (Gr) wavelength band are arranged in an alternating manner, and a parallel row in which pixel values in the green (Gb) wavelength band and pixel values in the blue (B) wavelength band are arranged in an alternating manner. In other words, pixel values in the same wavelength band are not adjacent to each other. Note that the filters in each wavelength band can be arranged in any pattern, and the pattern in not limited to a Bayer array. However, in general, it is unlikely that pixel values in the same wavelength band will be adjacent to each other.

Accordingly, in a RAW image obtained by sequentially reading out from the image sensor, there is a weak correlation between adjacent pixel values, and a high spatial frequency. As such, with an encoding method that uses prediction utilizing the correlation within an image (among pixels) as described above, there is a risk that the prediction accuracy will drop and the encoding efficiency will drop as a result.

Accordingly, a method of classifying each pixel value of a RAW image into a red (R), green (G), or blue (B) wavelength band of a color filter, generating an image constituted by pixel values in one type of wavelength band (i.e., an image in each wavelength band), and encoding the image in each wavelength band has been considered (see PTL 1, for example). This makes it possible to improve the prediction accuracy within the image (among the pixels), which in turn makes it possible to further suppress a drop in the encoding efficiency.

Incidentally, in recent years, a polarization sensor has been developed which detects incident light to which a polarization angle has been applied by a polarization filter. The polarization filter is a filter that transmits only light having a predetermined polarization angle. In other words, the light transmitted by the polarization filter is applied with the polarization angle of the filter as an optical characteristic. The pixel array of the polarization sensor is provided with such a polarization filter, and a polarization angle is applied as an optical characteristic for incident light on each pixel.

This polarization angle is set for each pixel. The polarization filter may apply a plurality of types of polarization angles as optical characteristics for incident light over the entire pixel array. For example, the polarization filter may be constituted by one pixel's worth of a filter that transmits light having a polarization angle of 0 degrees, one pixel's worth of a filter that transmits light having a polarization angle of 45 degrees, one pixel's worth of a filter that transmits light having a polarization angle of 90 degrees, and one pixel's worth of a filter that transmits light having a polarization angle of 135 degrees, arranged as an array having a predetermined arrangement pattern.

In that case, for example, in a pixel provided with a filter that transmits light having a polarization angle of 0 degrees, incident light having a polarization angle of 0 degrees is detected. In a pixel provided with a filter that transmits light having a polarization angle of 45 degrees, incident light having a polarization angle of 45 degrees is detected. Furthermore, in a pixel provided with a filter that transmits light having a polarization angle of 90 degrees, incident light having a polarization angle of 90 degrees is detected. Finally, in a pixel provided with a filter that transmits light having a polarization angle of 135 degrees, incident light having a polarization angle of 135 degrees is detected.

Accordingly, the RAW image output from the polarization sensor is constituted by pixel values corresponding to respective polarization angles, distributed in the arrangement pattern of the filters corresponding to the respective polarization angles. Accordingly, in general, the RAW image includes parts in which pixel values corresponding to different polarization angles are adjacent to each other.

There is a weak correlation between pixel values corresponding to different polarization angles, and a high spatial frequency. As such, when an encoding method that uses prediction utilizing the correlation within an image (among pixels) as described above is applied to the encoding of a RAW image output from such a polarization sensor, there is a risk that the prediction accuracy will drop and the encoding efficiency will drop as a result.

Furthermore, with the method described in PTL 1, an image can only be generated for each wavelength band, and it has been difficult to separate RAW images according to the polarization angle applied to the incident light (i.e., to generate images according to the polarization angle). In other words, even if the method described in PTL 1 is applied, it has been difficult to suppress a drop in encoding efficiency for RAW images output from a polarization sensor.

2. First Embodiment

<2-1. Reconfiguration of Image According to Polarization Angle Characteristic>

Accordingly, an image is reconfigured using the polarization angle, as indicated in the uppermost row of the table in FIG. 3 (Method 1).

In the present specification, "reconfiguration" refers to extracting and collecting pixel values of pixels having the same characteristic values for a predetermined optical characteristic from one or more images. "Collecting" the pixel values refers to arranging the pixel values in a two-dimensional plane (i.e., generating an image).

Also, in the present specification, "image" refers to two-dimensional array (distribution) data (also referred to as "2D data") of pixel values obtained in a pixel array of a sensor. In other words, the image need not be data obtained by detecting visible light. For example, the image may be data obtained by detecting non-visible light, or may be depth values or the like.

<2-1-1. Reconfiguration According to Polarization Angle Characteristic of RAW Image>

For example, an encoder that encodes RAW images may reconfigure and encode RAW images with optical characteristic parameters including at least the polarization angle characteristic, as indicated in the second row from the top of the table in FIG. 3 (Method 1-1).

For example, an image processing method may include: generating, by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, a polarization angle characteristic reconfiguration image constituted by pixel values of the pixels that have detected the incident light for which characteristic values of at least the polarization angle characteristic are the same; and then encoding the polarization angle characteristic reconfiguration image generated.

For example, an image processing device may include: a reconfiguring unit that, by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, generates a polarization angle characteristic reconfiguration image constituted by pixel values of the pixels that have detected the incident light for which characteristic values of at least the polarization angle characteristic are the same; and an encoding unit that encodes the polarization angle characteristic reconfiguration image generated.

In other words, by reconfiguring the pixel values of the RAW image output from the polarization sensor according to the polarization angle characteristic, the encoder generates a polarization angle characteristic reconfiguration image constituted by pixel values having the same characteristic value (polarization angle) with respect to the polarization angle characteristic. Then, the encoder encodes the polarization angle characteristic reconfiguration image generated for each of the characteristic values (polarization angles).

Doing so makes it possible for the encoder to suppress a drop in the encoding efficiency of the RAW image. Accordingly, the encoder can suppress an increase in the amount of transmitted data, the power consumption, and electromagnetic noise. This also makes it possible for the encoder to suppress an increase in the manufacturing cost and the device size. Furthermore, by suppressing a drop in the encoding efficiency, the subjective image quality of the decoded image can be improved for the same amount of transmitted data. In other words, the encoder can suppress a drop in the subjective image quality of the decoded image.

Note that in the present embodiment, "polarization angle characteristic reconfiguration image" refers to an image reconfigured according to one or more optical characteristic parameters including the polarization angle characteristic. In other words, the polarization angle characteristic reconfiguration image includes an image reconfigured only according to the polarization angle characteristic, and an image reconfigured according to the polarization angle characteristic and other optical characteristics.

<Transmission Wavelength Characteristic 1>

The polarization sensor may be a monochromatic polarization sensor that detects a luminance value for each polarization angle, or a color polarization sensor that detects a luminance value of each color (wavelength band) for each polarization angle.

In other words, the above-described optical characteristics (parameters) may include optical characteristics aside from the polarization angle characteristic. For example, the optical characteristics (parameters) may further include a transmission wavelength characteristic, as indicated in the third row from the top of the table in FIG. 3 (Method 1-1-1). The transmission wavelength characteristic is a wavelength characteristic of the incident light detected in the pixel of the polarization sensor. This indicates, for example, the color (wavelength band) of the color filter through which the incident light is transmitted in a color image sensor (red (R), green (G), blue (B), or the like).

Figure 4:
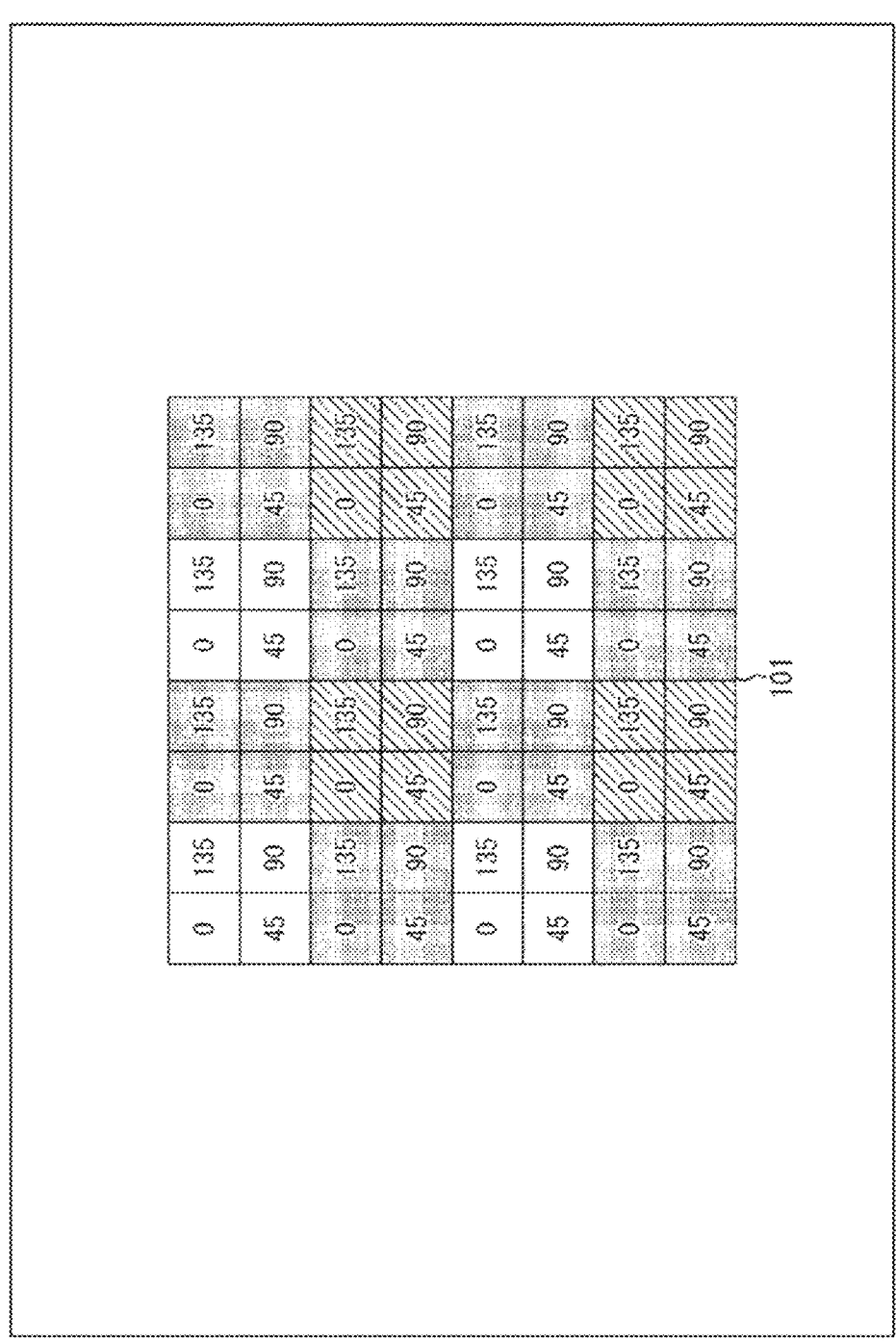
FIG. 4 is a diagram illustrating an example of the configuration of a RAW image from a polarization sensor.

FIG. 4 illustrates an example of a RAW image output from a color polarization sensor. A RAW image 101 illustrated in FIG. 4 is an example of a RAW image output from a polarization sensor provided with polarization filters and color filters in a pixel array. Each square of the RAW image 101 indicates a pixel value, where a pixel indicated by white represents a pixel value in the blue (B) wavelength band, a pixel indicated by gray represents a pixel value in the green (G) wavelength band, and a pixel indicated by hatching represents a pixel value in the red (R) wavelength band.

The encoder may reconfigure this RAW image 101 according to the polarization angle characteristic, according to the transmission wavelength characteristic, or according to both the polarization angle characteristic and the transmission wavelength characteristic.

<Reconfiguration Order>

For example, the encoder may perform the reconfiguration according to the transmission wavelength characteristic, and further perform the reconfiguration according to the polarization angle characteristic, as indicated in the fourth row from the top of the table in FIG. 3 (Method 1-1-1-1).

In other words, the encoder may generate a transmission wavelength characteristic reconfiguration image constituted by pixel values of the pixels that have detected the incident light for which characteristic values of the transmission wavelength characteristic are the same by reconfiguring the RAW image according to the transmission wavelength characteristic, and generate a polarization angle characteristic reconfiguration image by reconfiguring the transmission wavelength characteristic reconfiguration image according to the polarization angle characteristic.

Figure 5:
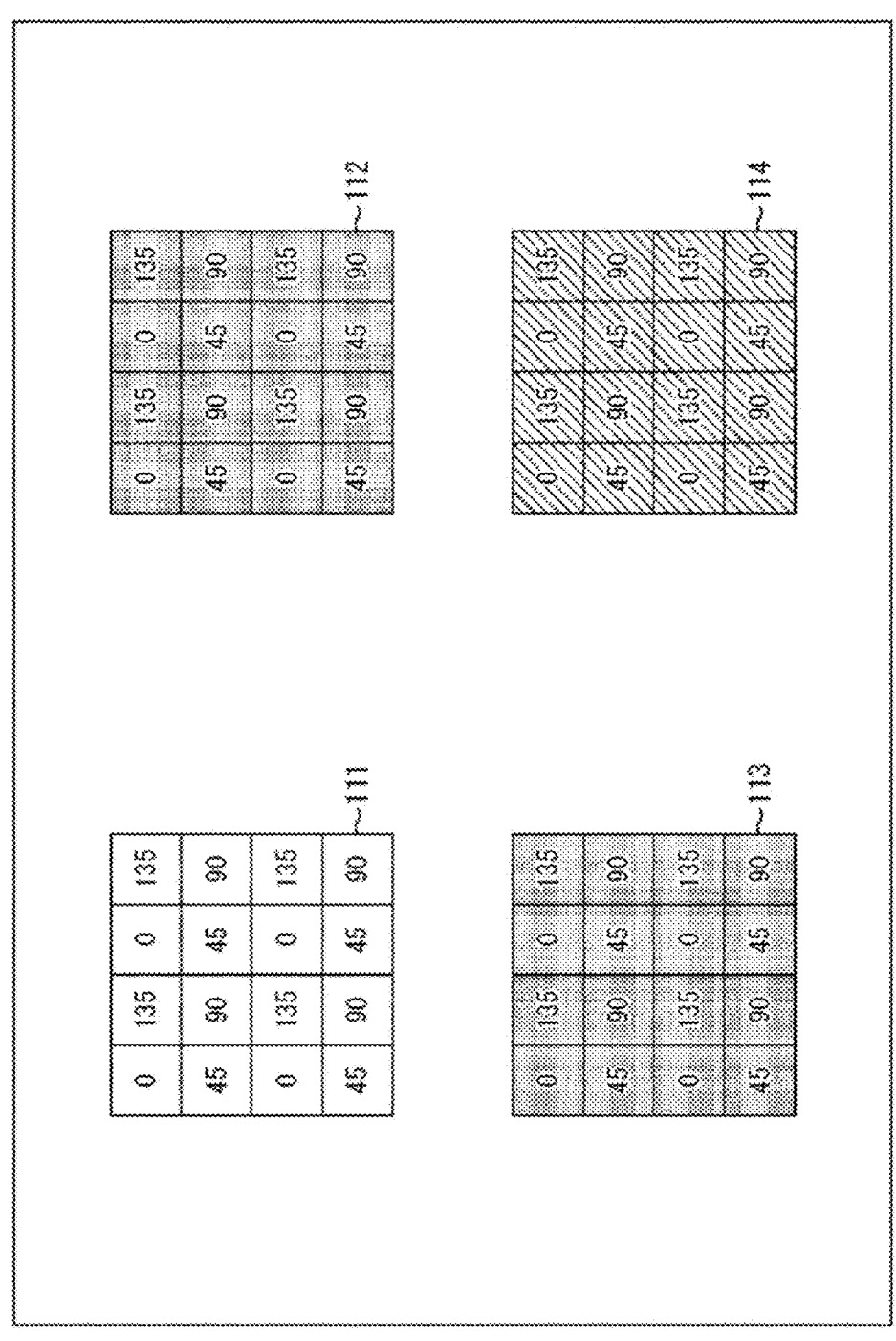
FIG. 5 is a diagram illustrating an example of a transmission wavelength characteristic reconfiguration image.

For example, the encoder may generate the transmission wavelength characteristic reconfiguration image as illustrated in FIG. 5 by reconfiguring the RAW image 101 illustrated in FIG. 4 according to the transmission wavelength characteristic. In FIG. 5, a transmission wavelength characteristic reconfiguration image 111 is a reconfiguration image constituted by pixel values in the blue (B) wavelength band. A transmission wavelength characteristic reconfiguration image 112 is a reconfiguration image constituted by pixel values in the green (Gb) wavelength band. A transmission wavelength characteristic reconfiguration image 113 is a reconfiguration image constituted by pixel values in the green (Gr) wavelength band. A transmission wavelength characteristic reconfiguration image 114 is a reconfiguration image constituted by pixel values in the red (R) wavelength band.

Figure 6:
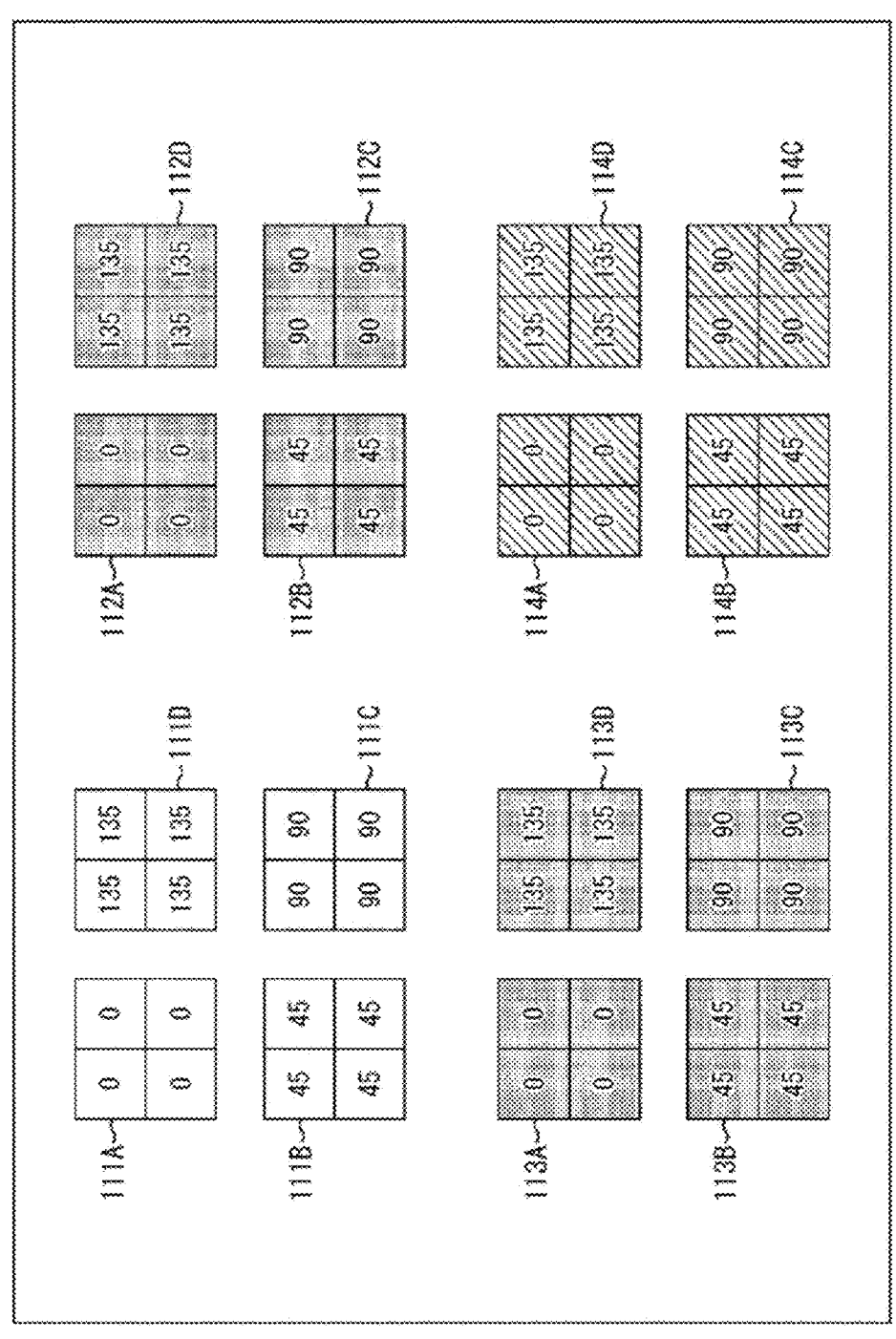
FIG. 6 is a diagram illustrating an example of a polarization angle characteristic reconfiguration image.

The encoder may further generate a polarization angle characteristic reconfiguration image as illustrated in FIG. 6 by reconfiguring each transmission wavelength characteristic reconfiguration image according to the polarization angle characteristic. In FIG. 6, a polarization angle characteristic reconfiguration image 111A is a reconfiguration image constituted by pixel values having a polarization angle of 0 degrees in the blue (B) wavelength band. A polarization angle characteristic reconfiguration image 111B is a reconfiguration image constituted by pixel values having a polarization angle of 45 degrees in the blue (B) wavelength band. A polarization angle characteristic reconfiguration image 111C is a reconfiguration image constituted by pixel values having a polarization angle of 90 degrees in the blue (B) wavelength band. A polarization angle characteristic reconfiguration image 111D is a reconfiguration image constituted by pixel values having a polarization angle of 135 degrees in the blue (B) wavelength band.

Additionally, a polarization angle characteristic reconfiguration image 112A is a reconfiguration image constituted by pixel values having a polarization angle of 0 degrees in the green (Gb) wavelength band. A polarization angle characteristic reconfiguration image 112B is a reconfiguration image constituted by pixel values having a polarization angle of 45 degrees in the green (Gb) wavelength band. A polarization angle characteristic reconfiguration image 112C is a reconfiguration image constituted by pixel values having a polarization angle of 90 degrees in the green (Gb) wavelength band. A polarization angle characteristic reconfiguration image 112D is a reconfiguration image constituted by pixel values having a polarization angle of 135 degrees in the green (Gb) wavelength band.

Furthermore, a polarization angle characteristic reconfiguration image 113A is a reconfiguration image constituted by pixel values having a polarization angle of 0 degrees in the green (Gr) wavelength band. A polarization angle characteristic reconfiguration image 113B is a reconfiguration image constituted by pixel values having a polarization angle of 45 degrees in the green (Gr) wavelength band. A polarization angle characteristic reconfiguration image 113C is a reconfiguration image constituted by pixel values having a polarization angle of 90 degrees in the green (Gr) wavelength band. A polarization angle characteristic reconfiguration image 113D is a reconfiguration image constituted by pixel values having a polarization angle of 135 degrees in the green (Gr) wavelength band.

Additionally, a polarization angle characteristic reconfiguration image 114A is a reconfiguration image constituted by pixel values having a polarization angle of 0 degrees in the red (R) wavelength band. A polarization angle characteristic reconfiguration image 114B is a reconfiguration image constituted by pixel values having a polarization angle of 45 degrees in the red (R) wavelength band. A polarization angle characteristic reconfiguration image 114C is a reconfiguration image constituted by pixel values having a polarization angle of 90 degrees in the red (R) wavelength band. A polarization angle characteristic reconfiguration image 114D is a reconfiguration image constituted by pixel values having a polarization angle of 135 degrees in the red (R) wavelength band.

In other words, each polarization angle characteristic reconfiguration image illustrated in FIG. 6 is an image in which the RAW image 101 is reconfigured according to the transmission wavelength characteristic and the polarization angle characteristic.

By repeating the reconfiguration for each optical characteristic in this manner, the encoder can easily perform the reconfiguration for a plurality of optical characteristics. Doing so also enables the encoder to perform control such as, for example, performing reconfiguration only for optical characteristics that require reconfiguration, and omitting the reconfiguration for optical characteristics that do not require reconfiguration.

Note that any order may be used for the optical characteristics for which the reconfiguration is to be performed, and the order is not limited to the example described above. For example, the encoder may perform the reconfiguration according to the polarization angle characteristic first, and then perform the reconfiguration according to the transmission wavelength characteristic on that reconfiguration image.

<Encoding Order Alignment>

The encoder encodes the polarization angle characteristic reconfiguration image generated as described above. At this time, the encoder may align the polarization angle characteristic reconfiguration images such that the same characteristic values are continuous for the transmission wavelength characteristic, and encode the polarization angle characteristic reconfiguration images in that order, as indicated in the fifth row from the top of the table in FIG. 3, for example (Method 1-1-1-2).

In other words, the encoder may encode a plurality of polarization angle characteristic reconfiguration images in an order based on the characteristic values of the transmission wavelength characteristic. More specifically, the encoder may encode a plurality of polarization angle characteristic reconfiguration images in an order such that the same characteristic values are continuous for the transmission wavelength characteristic.

Doing so makes it possible for the encoder to increase prediction that utilizes the correlation between the polarization angle characteristic reconfiguration images having the same characteristic values. Generally speaking, there is a high correlation between polarization angle characteristic reconfiguration images having the same characteristic values, and it is therefore possible for the encoder to suppress a drop in prediction accuracy between images (polarization angle characteristic reconfiguration images) by performing such processing. In other words, the encoder can further suppress a drop in the encoding efficiency of the RAW image.

Note that the encoder may encode a plurality of polarization angle characteristic reconfiguration images reconfigured according to the polarization angle characteristic and other optical characteristics in an order based on the characteristic values of the polarization angle characteristic. More specifically, the encoder may encode a plurality of polarization angle characteristic reconfiguration images in an order such that the same characteristic values are continuous for the polarization angle characteristic. In this case, too, the encoder can suppress a drop in the prediction accuracy between the images (the polarization angle characteristic reconfiguration images). In other words, the encoder can further suppress a drop in the encoding efficiency of the RAW image.

<Encoding Method>

The encoder may encode the reconfiguration image by applying prediction utilizing the correlation among pixels, among images, or the like, for example, as indicated in the sixth row from the top of the table in FIG. 3 (Method 1-1-1-3).

In other words, the encoder may encode the polarization angle characteristic reconfiguration image using prediction that utilizes intra-image correlation or inter-image correlation. Doing so makes it possible for the encoder to further suppress a drop in the encoding efficiency of the RAW image as described above.

<2-1-2. Polarization Angle Characteristic Reconfiguration Image Decoding and Development Processing>

For example, a decoder that decodes the encoded data of the RAW image may decode the encoded data and perform development processing on the obtained polarization angle characteristic reconfiguration image, as indicated in the seventh row from the top of the table in FIG. 3 (Method 1-2).

For example, an image processing method may include: generating, by decoding encoded data, a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and performing development processing on the polarization angle characteristic reconfiguration image generated.

For example, an image processing device may include: a decoding unit that, by decoding encoded data, generates a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and a development processing unit that performs development processing on the polarization angle characteristic reconfiguration image.

In other words, the decoder decodes the encoded data of the polarization angle characteristic reconfiguration image generated by the encoder as described above, performs development processing on the obtained polarization angle characteristic reconfiguration image, and generates a post-development image. Accordingly, the decoder can correctly generate the post-development image from the encoded data generated by the encoder. The decoder can therefore suppress a drop in the encoding efficiency of the RAW image. As such, the decoder can suppress an increase in the amount of transmitted data, the power consumption, and electromagnetic noise. This also makes it possible for the decoder to suppress an increase in the manufacturing cost and the device size. Furthermore, by suppressing a drop in the encoding efficiency, the subjective image quality of the decoded image can be improved for the same amount of transmitted data. In other words, the decoder can suppress a drop in the subjective image quality of the decoded image.

Note that, in the present specification, "development processing" refers to processing that separates the reconfiguration image obtained by decoding into transmission wavelength characteristics (for example, for each color) and interpolates missing pixel values. For example, in the case of processing on a RAW image output from an image sensor to which a Bayer array color filter is applied, the development processing is also referred to as "demosaicing".

<Transmission Wavelength Characteristic 2>

Note that the polarization sensor that outputs the RAW image may be a monochromatic polarization sensor that detects a luminance value for each polarization angle, or a color polarization sensor that detects a luminance value of each color (wavelength band) for each polarization angle.

In other words, the above-described optical characteristics (parameters) may include optical characteristics aside from the polarization angle characteristic. For example, the optical characteristics (parameters) may further include a transmission wavelength characteristic, as indicated in the eighth row from the top of the table in FIG. 3 (Method 1-2-1). The transmission wavelength characteristic is the same as that described with respect to the encoding side.

<Reconfiguration Processing>

For example, the decoder may reconfigure the polarization angle characteristic reconfiguration image obtained by decoding the encoded data according to the polarization angle characteristic, as indicated in the ninth row from the top of the table in FIG. 3 (Method 1-2-1-1).

In other words, the decoder may reconfigure, according to the polarization angle characteristic, the polarization angle characteristic reconfiguration image which has been obtained by decoding the encoded data and which has been reconfigured according to the optical characteristics including the polarization angle characteristic and the transmission wavelength characteristic, and then perform the development processing on the reconfigured polarization angle characteristic reconfiguration image.

For example, if the encoder has reconfigured and encoded the RAW image according to a plurality of optical characteristics including the polarization angle characteristic, the decoder obtains a polarization angle characteristic reconfiguration image reconfigured according to the plurality of optical characteristics, including the polarization angle characteristic, by decoding the encoded data. For example, if the encoder has reconfigured and encoded the RAW image according to the polarization angle characteristic and the transmission wavelength characteristic, the decoder obtains a polarization angle characteristic reconfiguration image such as that illustrated in FIG. 6 by decoding the encoded data.

In this case, the decoder may reconfigure the polarization angle characteristic reconfiguration image before performing the development processing, and generate a polarization angle characteristic reconfiguration image reconfigured only according to the polarization angle characteristic. For example, the decoder generates a polarization angle characteristic reconfiguration image such as that illustrated in FIG. 7 by performing such reconfiguration on the polarization angle characteristic reconfiguration image illustrated in FIG. 6.

Figure 7:
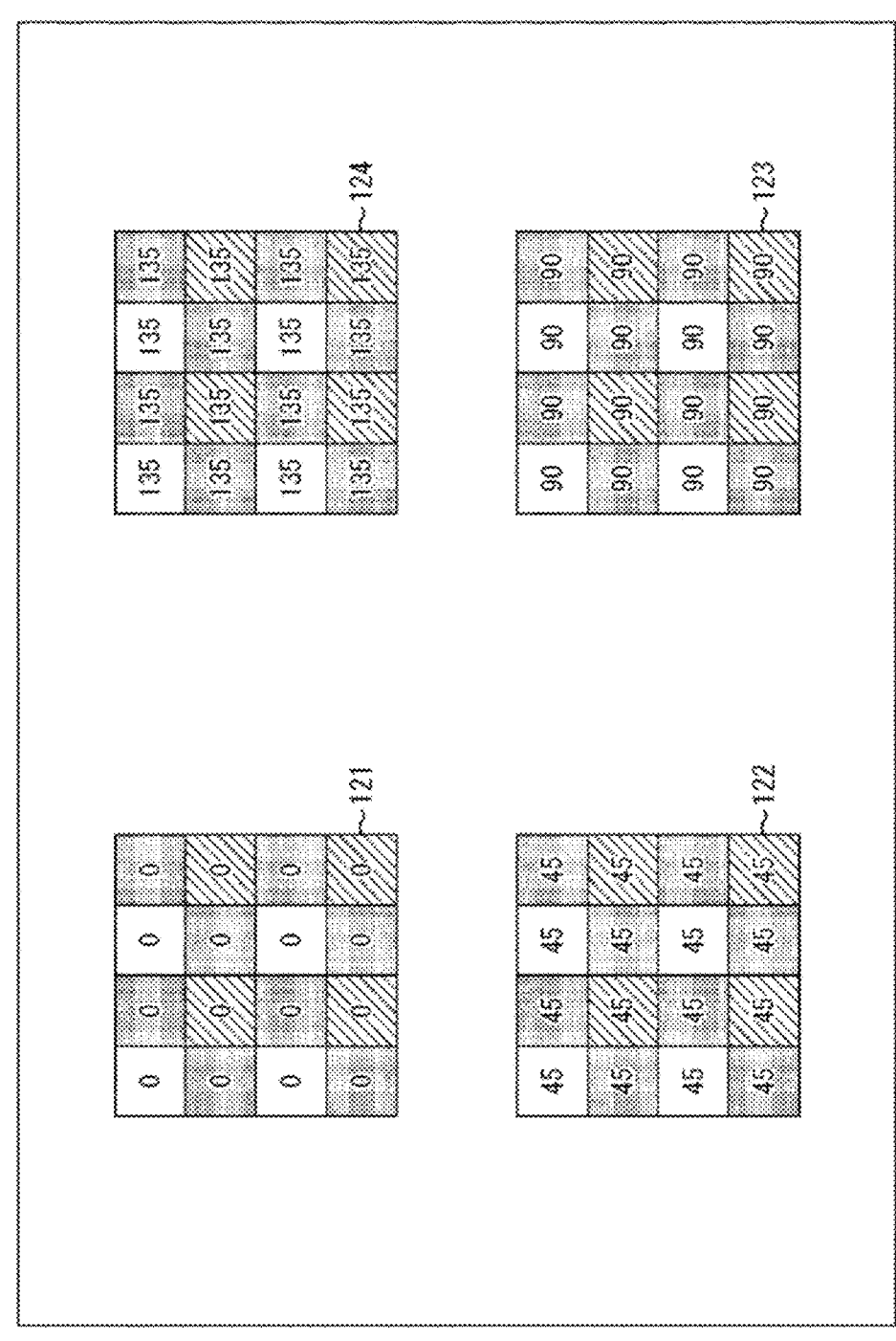
FIG. 7 is a diagram illustrating an example of reconfiguration using only a polarization angle.

In FIG. 7, a polarization angle characteristic reconfiguration image 121 is a reconfiguration image constituted by pixel values having a polarization angle of 0 degrees. The decoder generates this polarization angle characteristic reconfiguration image 121 by reconfiguring the polarization angle characteristic reconfiguration image 111A, the polarization angle characteristic reconfiguration image 112A, the polarization angle characteristic reconfiguration image 113A, and the polarization angle characteristic reconfiguration image 114A illustrated in FIG. 6.

Additionally, a polarization angle characteristic reconfiguration image 122 is a reconfiguration image constituted by pixel values having a polarization angle of 45 degrees. The decoder generates this polarization angle characteristic reconfiguration image 122 by reconfiguring the polarization angle characteristic reconfiguration image 111B, the polarization angle characteristic reconfiguration image 112B, the polarization angle characteristic reconfiguration image 113B, and the polarization angle characteristic reconfiguration image 114B illustrated in FIG. 6.

Furthermore, a polarization angle characteristic reconfiguration image 123 is a reconfiguration image constituted by pixel values having a polarization angle of 90 degrees. The decoder generates this polarization angle characteristic reconfiguration image 123 by reconfiguring the polarization angle characteristic reconfiguration image 111C, the polarization angle characteristic reconfiguration image 112C, the polarization angle characteristic reconfiguration image 113C, and the polarization angle characteristic reconfiguration image 114C illustrated in FIG. 6.

Additionally, a polarization angle characteristic reconfiguration image 124 is a reconfiguration image constituted by pixel values having a polarization angle of 135 degrees. The decoder generates this polarization angle characteristic reconfiguration image 124 by reconfiguring the polarization angle characteristic reconfiguration image 111D, the polarization angle characteristic reconfiguration image 112D, the polarization angle characteristic reconfiguration image 113D, and the polarization angle characteristic reconfiguration image 114D illustrated in FIG. 6.

Accordingly, the polarization angle characteristic reconfiguration image 121 to the polarization angle characteristic reconfiguration image 124 are equivalent to reconfiguration images in which the RAW image is reconfigured only according to the polarization angle characteristic. In other words, the polarization angle characteristic reconfiguration image 121 to the polarization angle characteristic reconfiguration image 124 include pixel values in the blue (B) wavelength band, pixel values in the green (Gb) wavelength band, pixel values in the green (Gr) wavelength band, and pixel values in the red (R) wavelength band, respectively.

Figure 8:
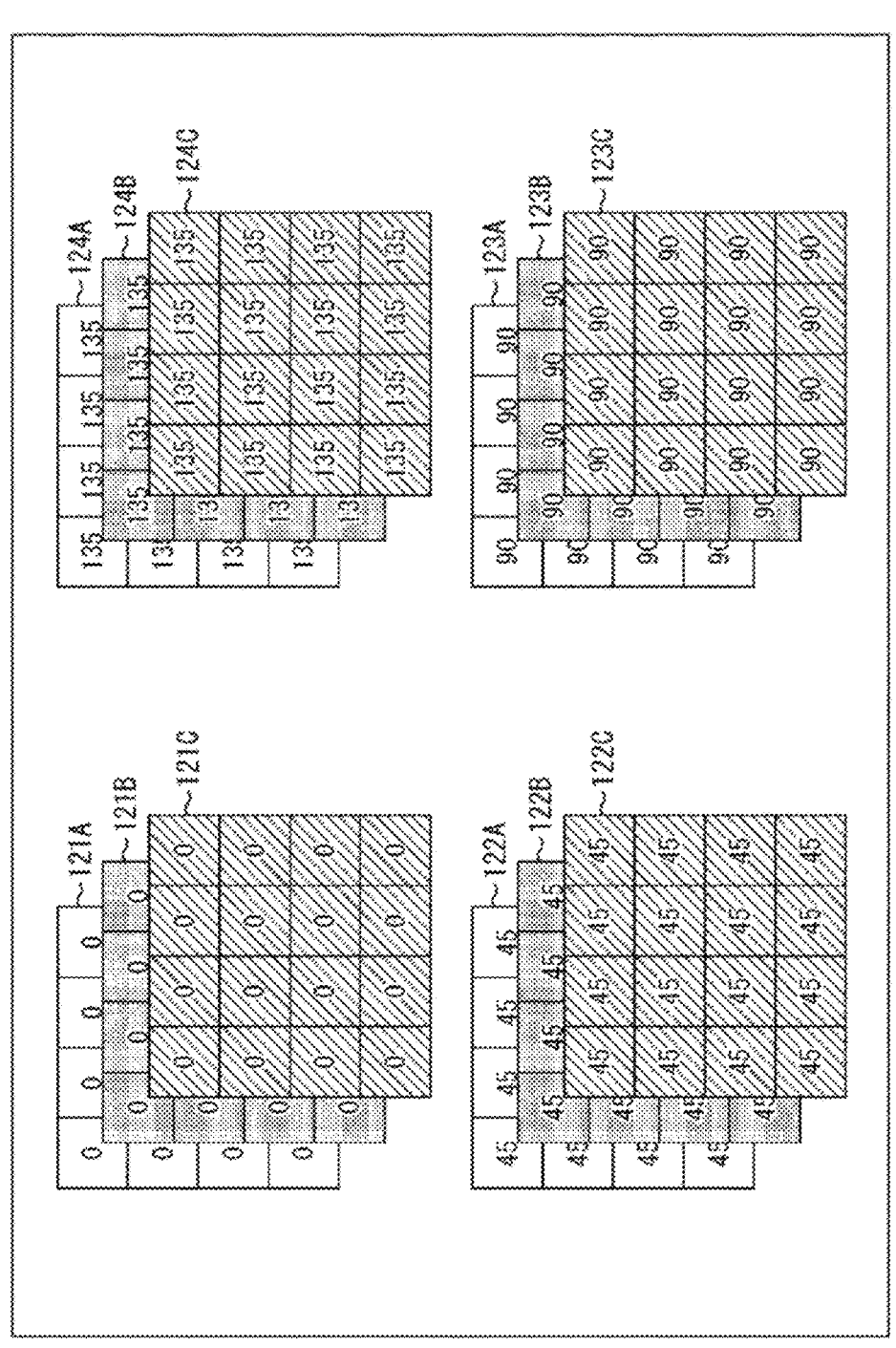
FIG. 8 is a diagram illustrating an example of a post-development image.

The decoder performs development processing on each of the polarization angle characteristic reconfiguration image 121 to the polarization angle characteristic reconfiguration image 124, and generates post-development images such as those illustrated in FIG. 8.

In FIG. 8, a post-development image 121A is a post development image in the blue (B) wavelength band. A post-development image 121B is a post-development image in the green (G) wavelength band. A post-development image 121C is a post-development image in the red (R) wavelength band. The decoder generates the post-development image 121A to the post-development image 121C by performing development processing on the polarization angle characteristic reconfiguration image 121.

Additionally, a post-development image 122A is a post-development image in the blue (B) wavelength band. A post-development image 122B is a post-development image in the green (G) wavelength band. A post-development image 122C is a post-development image in the red (R) wavelength band. The decoder generates the post-development image 122A to the post-development image 122C by performing development processing on the polarization angle characteristic reconfiguration image 122.

Furthermore, a post-development image 123A is a post-development image in the blue (B) wavelength band. A post-development image 123B is a post-development image in the green (G) wavelength band. A post-development image 123C is a post-development image in the red (R) wavelength band. The decoder generates the post-development image 123A to the post-development image 123C by performing development processing on the polarization angle characteristic reconfiguration image 123.

Additionally, a post-development image 124A is a post-development image in the blue (B) wavelength band. A post-development image 124B is a post-development image in the green (G) wavelength band. A post-development image 124C is a post-development image in the red (R) wavelength band. The decoder generates the post-development image 124A to the post-development image 124C by performing development processing on the polarization angle characteristic reconfiguration image 124.

Doing so makes it possible for the decoder to generate a post-development image for each characteristic value of the polarization angle characteristic.

<Image Processing>

Note that the decoder may perform image processing on the generated post-development image, for example, as indicated in the tenth row from the top of FIG. 3 (Method 1-2-2).

The image processing may be any type of image processing. For example, the decoder may perform noise reduction processing to reduce noise in the generated post-development image, as indicated in the eleventh row from the top of FIG. 3 (Method 1-2-2-1). Additionally, for example, the decoder may enlarge or reduce the generated post-development image, as indicated in the bottommost row of FIG. 3 (Method 1-2-2-2). By doing so, the decoder can suppress a drop in the subjective image quality of the decoded image.

<2-2. Polarization Sensor Unit>

Figure 9:
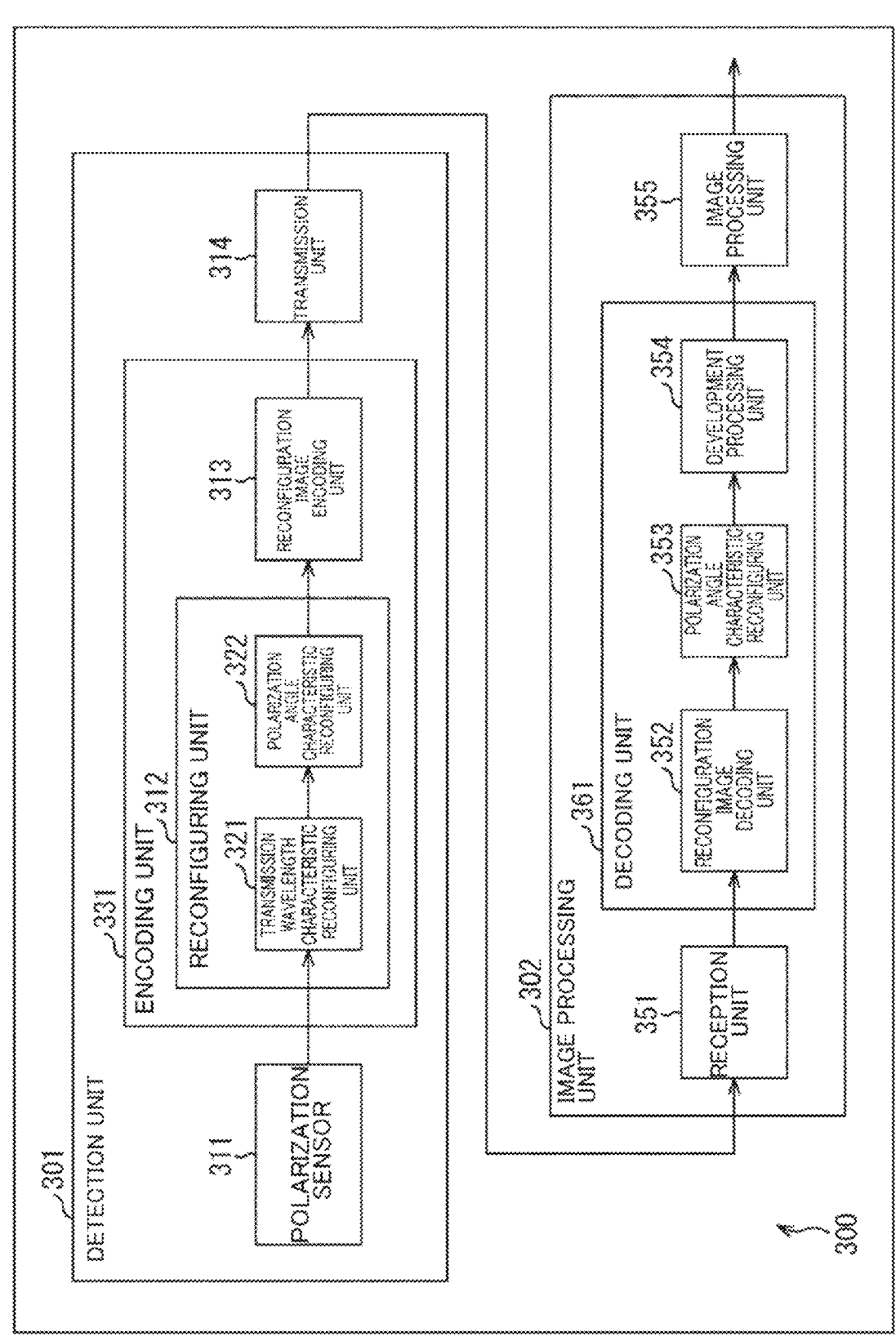
FIG. 9 is a block diagram illustrating an example of the main configuration of a polarization sensor unit.

A configuration to which the present technique described above is applied will be described next. FIG. 9 is a block diagram illustrating an example of the configuration of a polarization sensor unit serving as one aspect of the image processing device to which the present technique is applied. A polarization sensor unit 300 illustrated in FIG. 9 is a unit that generates a RAW image in which pixel values can be obtained for each polarization angle of the incident light using the polarization sensor, and performs image processing on the RAW image.

Although FIG. 9 illustrates major components such as processing units (blocks) and data flows, the processing units and data flows are not limited to those illustrated in FIG. 9. That is, processing units not illustrated in FIG. 9 as blocks and processing and data flows not illustrated in FIG. 9 as arrows or the like may be present in the polarization sensor unit 300.

As illustrated in FIG. 9, the polarization sensor unit 300 includes a detection unit 301 and an image processing unit 302. The detection unit 301 performs detection and outputs a RAW image (encoded data encoded by reconfiguring the RAW image) as a detection result for the detection target.

The detection unit 301 includes a polarization sensor 311, a reconfiguring unit 312, a reconfiguration image encoding unit 313, and a transmission unit 314.

The polarization sensor 311 has a pixel array provided with filters that impart optical characteristics including at least a polarization angle characteristic on the incident light, and detects, for each pixel of the pixel array, the incident light to which the optical characteristics including at least the polarization angle characteristic have been applied. In other words, the polarization sensor 311 includes at least polarization filters in the pixel array. For example, the polarization sensor 311 may include polarization filters and color filters in the pixel array. In other words, the optical characteristics applied to the incident light may further include a transmission wavelength characteristic, which is a wavelength characteristic of the incident light.

In other words, the polarization sensor 311 has a pixel array constituted by a plurality of types of pixels that detect incident light having different optical characteristics, including at least a polarization angle characteristic. The polarization sensor 311 outputs the result of detecting the incident light as a RAW image.

By obtaining the RAW image output from the polarization sensor 311 and reconfiguring the RAW image according to optical characteristics including at least the polarization angle characteristic, the reconfiguring unit 312 generates a polarization angle characteristic reconfiguration image constituted by pixel values of the pixels that have detected incident light for which characteristic values of at least the polarization angle characteristic are the same.

For example, when the polarization sensor 311 applies polarization angle and transmission wavelength characteristics on the incident light (e.g., the polarization sensor 311 includes a polarization filter and a color filter in the pixel array), the reconfiguring unit 312 may generate a transmission wavelength characteristic reconfiguration image constituted by pixel values of the pixels that have detected the incident light for which the characteristic values of the transmission wavelength characteristic are the same by reconfiguring the RAW image output from the polarization sensor 311 according to the transmission wavelength characteristic, and generate a polarization angle characteristic reconfiguration image by reconfiguring the transmission wavelength characteristic reconfiguration image according to the polarization angle characteristic.

In other words, the reconfiguring unit 312 may include a transmission wavelength characteristic reconfiguring unit 321 and a polarization angle characteristic reconfiguring unit 322, as illustrated in FIG. 9. The transmission wavelength characteristic reconfiguring unit 321 reconfigures the RAW image according to the transmission wavelength characteristic, and generates a transmission wavelength characteristic reconfiguration image. The polarization angle characteristic reconfiguring unit 322 reconfigures the transmission wavelength characteristic reconfiguration image according to the polarization angle characteristic, and generates a polarization angle characteristic reconfiguration image.

The reconfiguration image encoding unit 313 encodes the polarization angle reconfiguration image generated by the reconfiguring unit 312 (the polarization angle characteristic reconfiguring unit 322) through a predetermined encoding method, and generates encoded data. For example, the reconfiguration image encoding unit 313 may encode the polarization angle characteristic reconfiguration image using prediction that utilizes intra-image correlation or inter-image correlation. In addition, the reconfiguration image encoding unit 313 may encode a plurality of polarization angle characteristic reconfiguration images in an order based on the characteristic values of the transmission wavelength characteristic.

The transmission unit 314 transmits the encoded data generated by the reconfiguration image encoding unit 313 to the image processing unit 302. Note that the reconfiguring unit 312 and the reconfiguration image encoding unit 313 can also be considered to be an encoding unit 331.

The image processing unit 302 performs image processing on the RAW image generated by the detection unit 301. As illustrated in FIG. 9, the image processing unit 302 includes a reception unit 351, a reconfiguration image decoding unit 352, a polarization angle characteristic reconfiguring unit 353, a development processing unit 354, and an image processing unit 355.

The reception unit 351 obtains the encoded data transmitted from the detection unit 301 (the transmission unit 314) and supplies the encoded data to the reconfiguration image decoding unit 352.

The reconfiguration image decoding unit 352 decodes the encoded data supplied from the reception unit 351 and generates (restores) the polarization angle characteristic reconfiguration image. This polarization angle characteristic reconfiguration image is the reconfiguration image generated by the reconfiguring unit 312 of the detection unit 301 as described above. In other words, by decoding encoded data, the reconfiguration image decoding unit 352 generates a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same.

The polarization angle characteristic reconfiguring unit 353 reconfigures the polarization angle characteristic reconfiguration image generated (restored) by the reconfiguration image decoding unit 352, according to the polarization angle characteristic. In other words, the polarization angle characteristic reconfiguring unit 353 reconfigures, according to the polarization angle characteristic, the polarization angle characteristic reconfiguration image which has been obtained by the reconfiguration image decoding unit 352 decoding the encoded data and which has been reconfigured according to optical characteristics including the polarization angle characteristic and the transmission wavelength characteristic.

The development processing unit 354 performs development processing on the polarization angle characteristic reconfiguration image reconfigured by the polarization angle characteristic reconfiguring unit 353 according to the polarization angle characteristic, and generates a post-development image.

The image processing unit 355 performs image processing on the post-development image generated by the development processing unit 354. The image processing may be any type of image processing. For example, the image processing unit 355 may perform processing for reducing noise as the image processing. Additionally, the image processing unit 355 may enlarge or reduce the post-development image as the image processing. The image processing unit 355 outputs the post-development image subjected to the image processing to the exterior of the image processing unit 302, i.e., to the exterior of the polarization sensor unit 300.

Note that the reconfiguration image decoding unit 352, the polarization angle characteristic reconfiguring unit 353, and the development processing unit 354 can also be considered to be a decoding unit 361. Note that the polarization angle characteristic reconfiguring unit 353 may be omitted.

Providing the configuration described above makes it possible for the polarization sensor unit 300 to further suppress a drop in the encoding efficiency of the RAW image.

<Flow of Detection Processing>

Processing performed by this polarization sensor unit 300 will be described next. An example of the flow of the detection processing performed by the detection unit 301 will be described with reference to the flowchart illustrated in FIG. 10.

When the detection processing starts, in step S301, the polarization sensor 311 detects incident light and generates a RAW image.

In step S302, the reconfiguring unit 312 (the transmission wavelength characteristic reconfiguring unit 321) reconfigures the RAW image generated in step S301 according to the transmission wavelength characteristic, and generates a transmission wavelength characteristic reconfiguration image. In other words, the same number of reconfiguration images as there are types of characteristic values, i.e., N1 images, are generated. It is assumed that the order of the pixels in each reconfiguration image is kept in the order of the rows and columns in the RAW image.

In step S303, the reconfiguring unit 312 (the polarization angle characteristic reconfiguring unit 322) reconfigures the transmission wavelength characteristic reconfiguration image generated in step S302 according to the polarization angle characteristic, and generates a polarization angle characteristic reconfiguration image. In other words, the same number of reconfiguration images as there are types of characteristic values, i.e., N2 images, are generated. It is assumed that the order of the pixels in each reconfiguration image is kept in the order of the rows and columns in each reconfiguration image generated in step S302.

The same processing is repeated up to a total number of optical characteristics M. In total, N=N1×N2× . . . ×NM images are generated.

In other words, by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic, the reconfiguring unit 312 generates a polarization angle characteristic reconfiguration image constituted by pixel values of the pixels that have detected the incident light for which characteristic values of at least the polarization angle characteristic are the same.

In step S304, the reconfiguration image encoding unit 313 aligns the polarization angle characteristic reconfiguration images generated in step S303 in an encoding order.

In step S305, the reconfiguration image encoding unit 313 encodes the polarization angle characteristic reconfiguration images in the order from step S304, and generates the encoded data. The reconfiguration image encoding unit 313 encodes the generated N images through an image compression method. The image compression may be performed through a method that uses correlation within the same image, or through a method that uses correlation between images. When using correlation between images, the order of the compression processing is such that for a given optical characteristic, a group of images having the same characteristic values are encoded in sequence. This strengthens the correlation between neighboring images, which makes it possible to improve the encoding performance.

In other words, the reconfiguration image encoding unit 313 encodes the polarization angle characteristic reconfiguration image generated in step S303.

In step S306, the transmission unit 314 transmits the encoded data generated through the processing of step S305 to the image processing unit 302 (the reception unit 351).

When the processing of step S306 ends, the image processing ends.

<Flow of Image Processing>

An example of the flow of the image processing performed by the image processing unit 302 will be described next with reference to the flowchart illustrated in FIG. 11.

Figure 10:
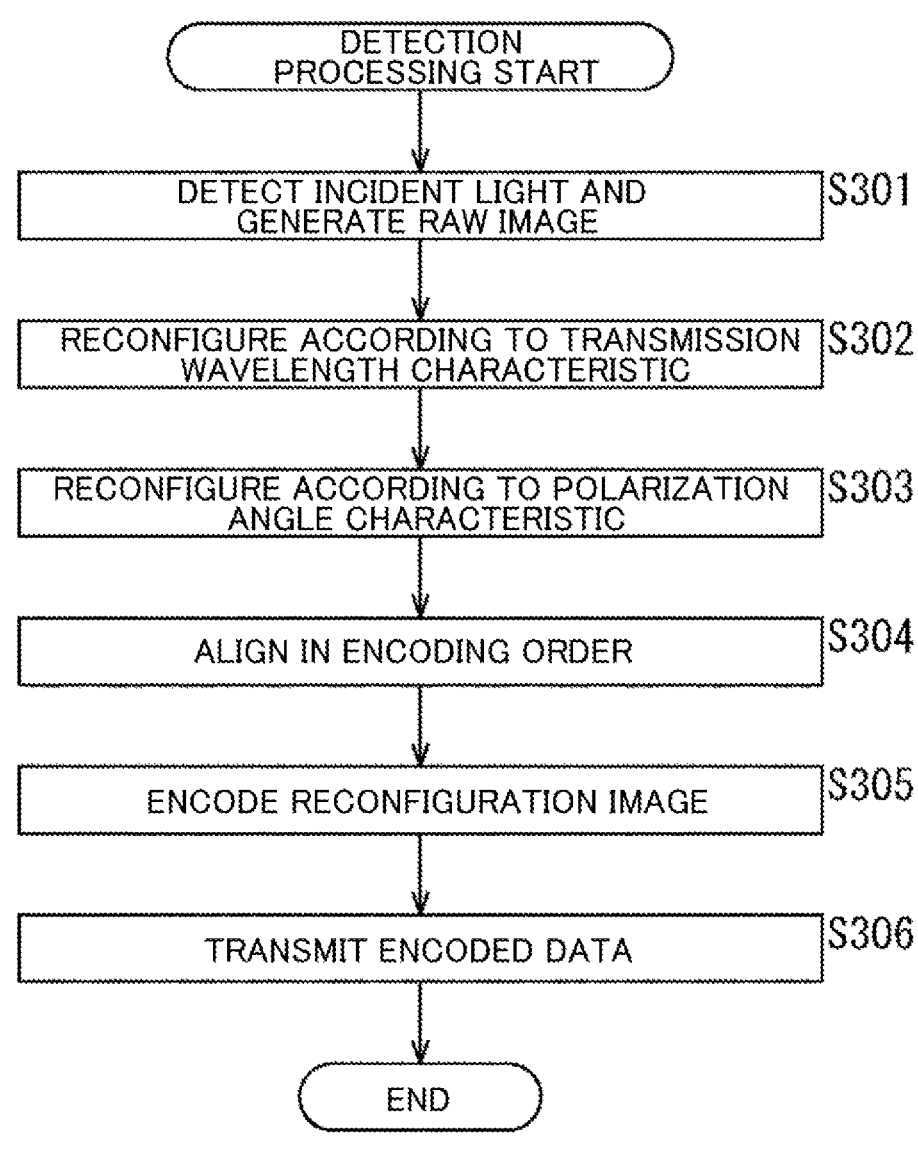
FIG. 10 is a flowchart illustrating an example of a method for detection processing.

When the image processing starts, in step S351, the reception unit 351 receives the encoded data transmitted in step S306 of FIG. 10.

In step S352, the reconfiguration image decoding unit 352 decodes the encoded data and generates (restores) the N polarization angle characteristic reconfiguration images.

In other words, by decoding encoded data, the reconfiguration image decoding unit 352 generates a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic, and the polarization angle characteristic reconfiguration image being constituted by pixel values of the pixels that have detected the incident light for which characteristic values of at least the polarization angle characteristic are the same.

In step S353, the polarization angle characteristic reconfiguring unit 353 performs reconfiguration according to the polarization angle characteristic. In other words, the polarization angle characteristic reconfiguring unit 353 selects pixels, from the N polarization angle characteristic reconfiguration images restored in step S352, so as to conform to the subsequent image processing as necessary, and arranges and reconfigures the images.

In step S354, the development processing unit 354 performs development processing on the polarization angle characteristic reconfiguration images, and generates a post-development image.

In step S355, the image processing unit 355 performs image processing, such as noise reduction, scaling, and the like, for example.

When the processing of step S355 ends, the image processing ends.

Performing the processing described above makes it possible for the polarization sensor unit 300 to further suppress a drop in the encoding efficiency of the RAW image.

3. Second Embodiment

<3-1. Reconfiguration of Image According to Transmission Wavelength Characteristic and Grid Points (Positions)>

<Multispectral Image Sensor>

An image sensor that obtains images at each of various wavelengths has also been developed. There have been cameras for obtaining images of subjects at each of a plurality of different wavelengths (called "spectroscopic cameras", "multispectral cameras", or the like, for example). There have also been image sensors in which a given type of filter, each having various transmission wavelengths, is arranged for each of photodiodes, making it possible to obtain images at more wavelengths than conventional three-color RGB sensors (called "multispectral image sensors", for example).

Figure 12:
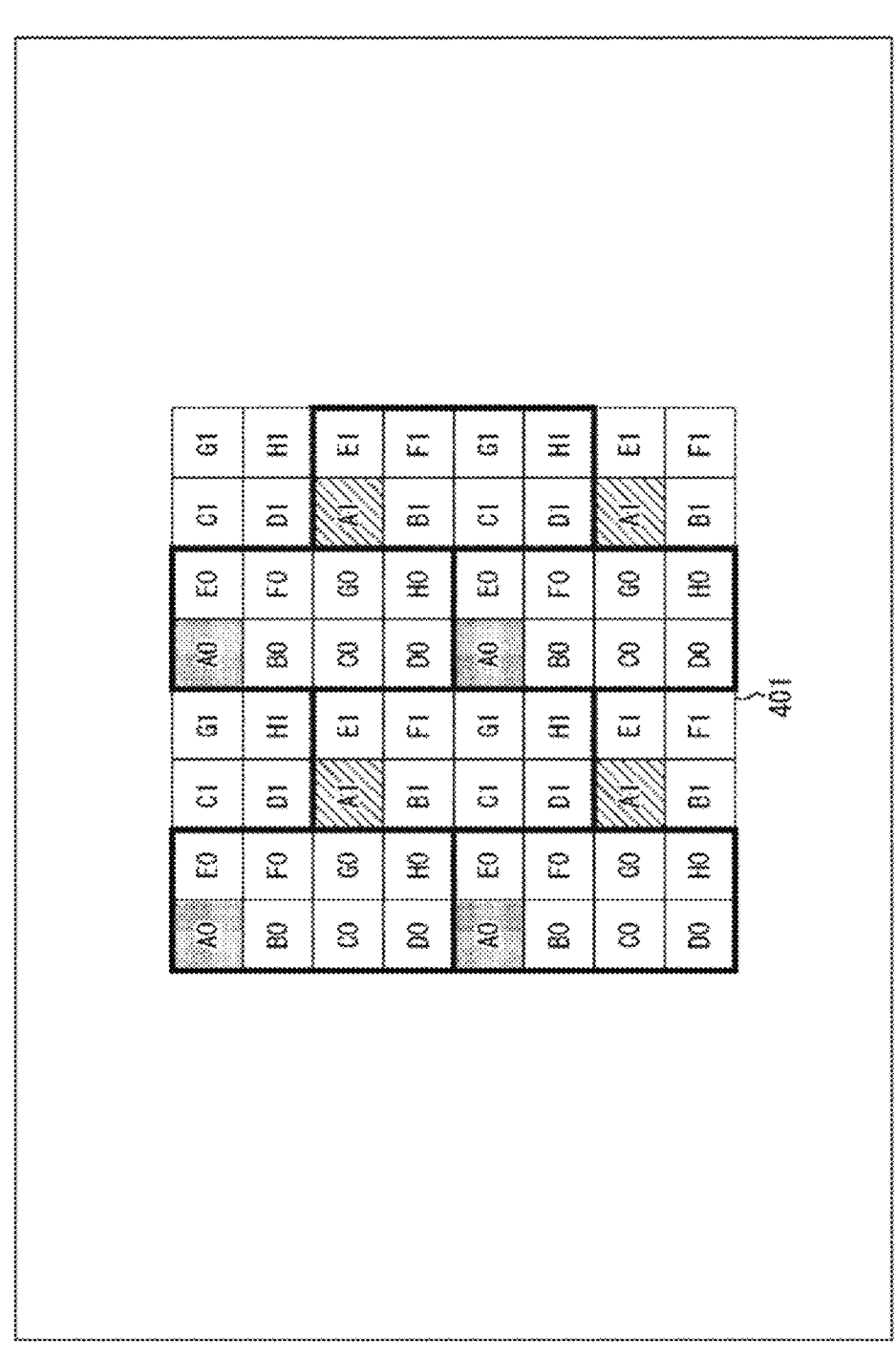
FIG. 12 is a diagram illustrating an example of the configuration of a RAW image from a multispectral image sensor.

As illustrated in FIG. 12, for example, a multispectral image sensor has a pixel group constituted by a set number of pixels having different transmission wavelengths provided adjacent to each other, and such pixel groups are arranged in a cyclical manner.

A RAW image 401 illustrated in FIG. 12 is an example of a RAW image generated by a multispectral image sensor. In FIG. 12, each square in the RAW image 401 indicates a pixel. A to H, assigned to each pixel, indicate an example of a characteristic value of a transmission wavelength characteristic. As illustrated in FIG. 12, the pixels in the RAW image 401 are in an arrangement pattern in which pixel groups in each of wavelength bands A to H are taken as unit groups and arranged by unit groups, as indicated by the bold lines. In addition, the positions of the unit groups that are adjacent to each other in the row direction are offset from each other in the column direction.

Accordingly, even in the same wavelength band, there are two types of pixels which are offset from each other with respect to the rows and columns, such as pixels A0 and pixels A1 illustrated in FIG. 12. Because the pixels A0 and pixels A1 are offset from each other with respect to the rows and columns, the correlation between these two pixels is low.

When a RAW image from a multispectral image sensor having such a pixel layout is reconfigured separately for each color as described in PTL 1, the images are combined into a single reconfiguration image in a state in which the pixels A0 and the pixels A1 are adjacent to each other. As such, there has been a risk of a drop in the encoding efficiency of the reconfiguration image.

<Use of Grid Points (Positions)>

Accordingly, the image is reconfigured using the transmission wavelength characteristic and grid points (pixel positions), as indicated in the uppermost row of the table in FIG. 13 (Method 2).

Figure 14:
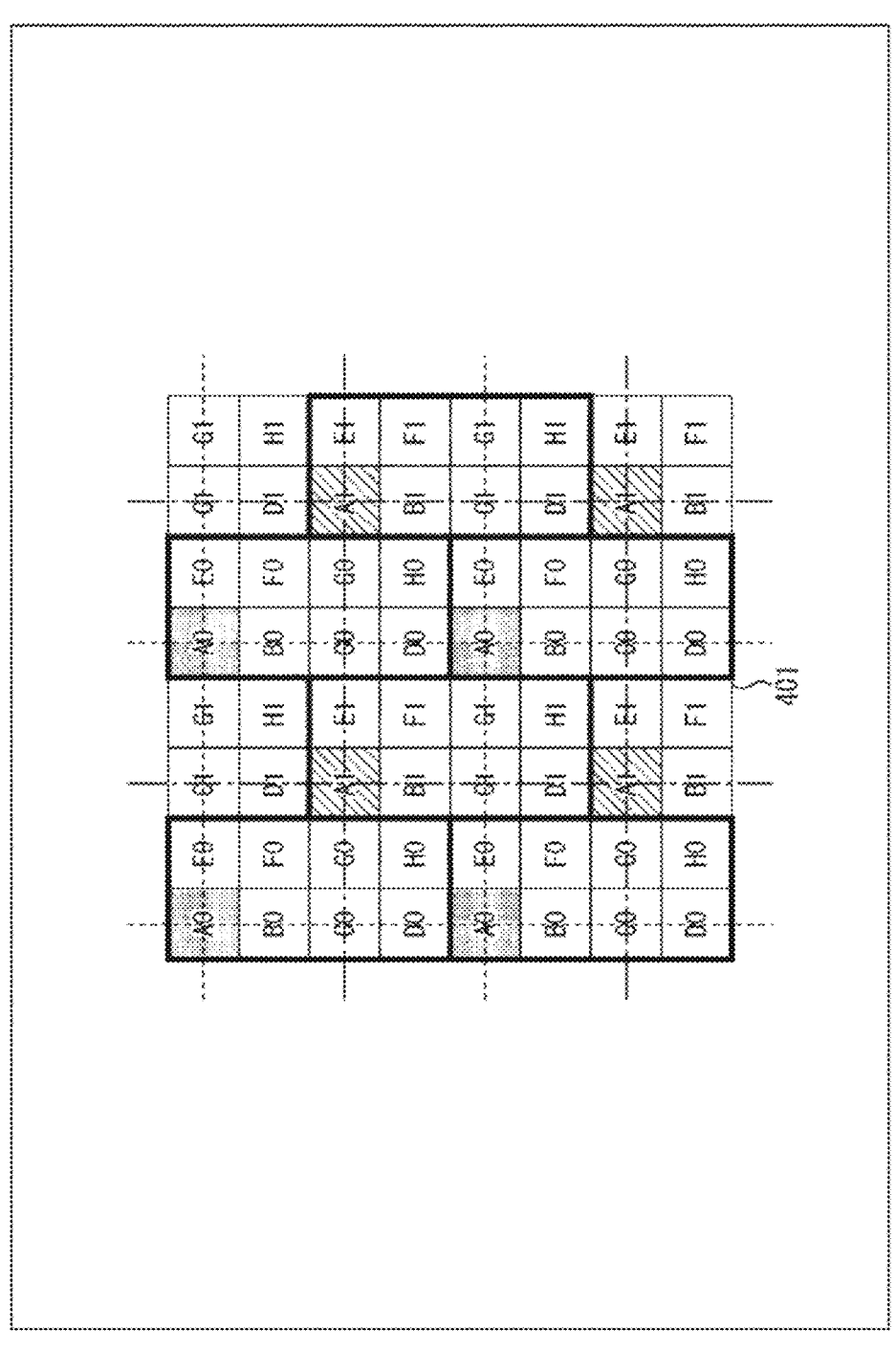
FIG. 14 is a diagram illustrating an example of grid points.

For example, when the pixels A0 and the pixels A1 are to be processed in the example in FIG. 12, when the rows and columns of the pixels A0 and the rows and columns of the pixels A1 are connected as indicated by the dotted lines or the dot-dash lines in FIG. 14, a rectangular grid (a square grid) formed by the dotted lines or the dot-dash lines is formed. For example, each vertex (grid point) of the square grid formed by the dotted lines corresponds to one of the pixels A0, and each vertex (grid point) of the square grid formed by the dot-dash lines corresponds to one of the pixels A1. Accordingly, the pixels A0 and the pixels A1 are identified according to the grid points of the square grid, after which the reconfiguration is performed.

<3-1-1. Reconfiguration of Image According to Transmission Wavelength Characteristic and Grid Points (Positions) of RAW Image>

For example, an encoder that encodes a RAW image may reconfigure the RAW image according to the transmission wavelength characteristic and the grid points, and encode the image, as indicated in the second row from the top of the table in FIG. 13 (Method 2-1).

For example, an image processing method may include: generating, by reconfiguring a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, a transmission wavelength characteristic-grid point reconfiguration image constituted by pixel values of the pixels that have detected the incident light for which characteristic values of the transmission wavelength characteristic are the same and that have same positions in a row direction or a column direction of the pixel array; and encoding the wavelength characteristic grid point reconfiguration image generated.

For example, an image processing device may include: a reconfiguring unit that, by reconfiguring a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, generates a transmission wavelength characteristic-grid point reconfiguration image constituted by pixel values of the pixels that have detected the incident light for which characteristic values of the transmission wavelength characteristic are the same and that have same positions in a row direction or a column direction of the pixel array; and an encoding unit that encodes the wavelength characteristic grid point reconfiguration image.

Figure 15:
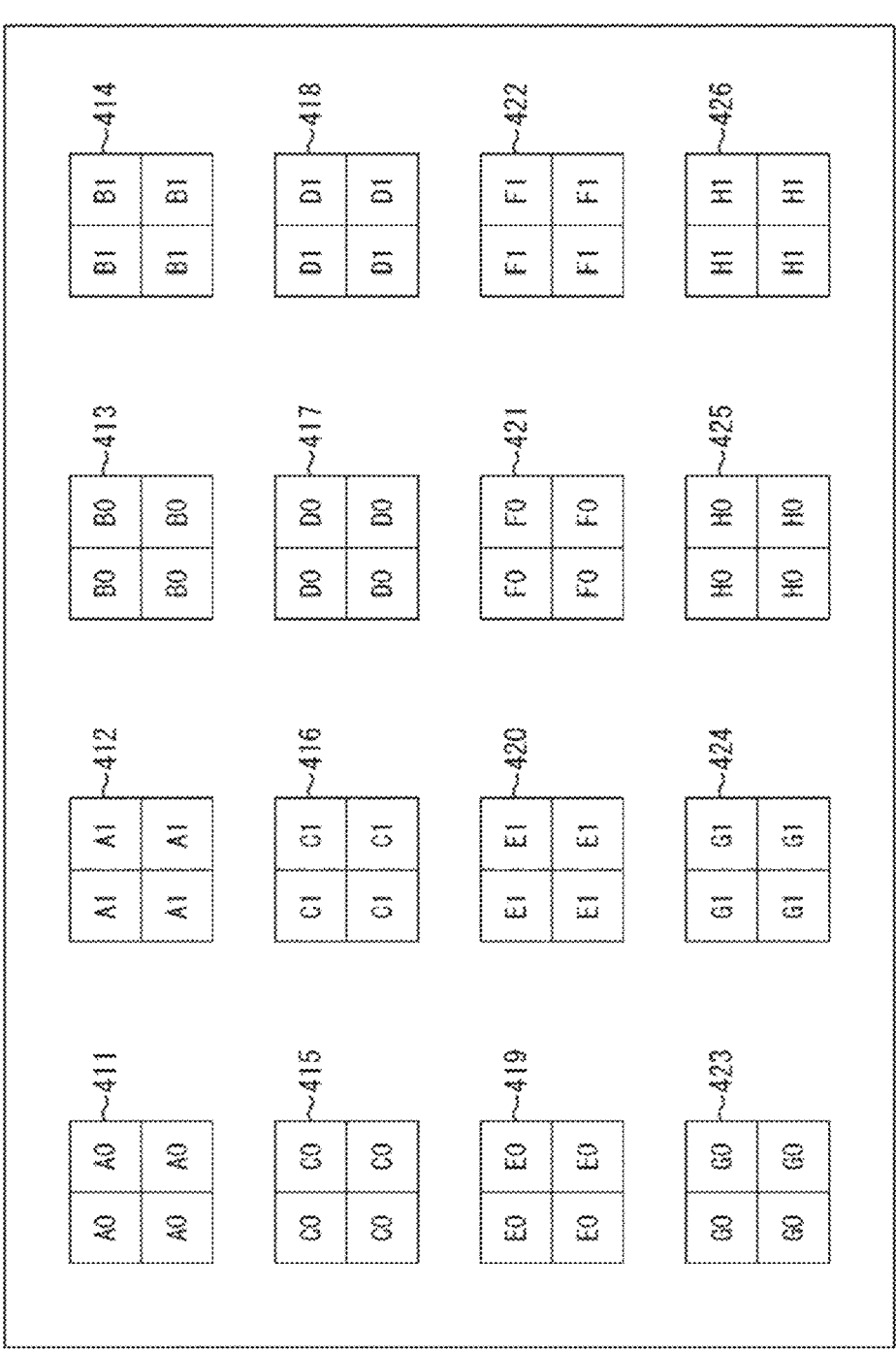
FIG. 15 is a diagram illustrating an example of a transmission wavelength characteristic-grid point reconfiguration image.

In other words, by reconfiguring the pixel values of the RAW image output from the multispectral image sensor according to the transmission wavelength characteristic and the positions of the pixels, the encoder generates a transmission wavelength characteristic-grid point reconfiguration image constituted by pixel values of pixels that have detected incident light for which characteristic values of the transmission wavelength characteristic are the same and that have same positions in the row direction or the column direction of the pixel array. For example, the encoder reconfigures the RAW image 401 illustrated in FIG. 14 and generates a transmission wavelength characteristic-grid point reconfiguration image 411 to a transmission wavelength characteristic-grid point reconfiguration image 426 as illustrated in FIG. 15. By performing the reconfiguration in this manner, the encoder can separate the pixel values (identify by 0 or 1) and reconfigure the image according to not only the transmission wavelength characteristic (A to H), but also the pixel positions, as illustrated in FIG. 15.

The encoder then encodes each transmission wavelength characteristic-grid point reconfiguration image generated for each transmission wavelength characteristic and pixel position.

Doing so makes it possible for the encoder to generate a reconfiguration image so as to suppress a drop in the prediction accuracy caused by the offset in the pixel positions (rows and columns). The encoder can therefore suppress a drop in the encoding efficiency of the RAW image. Accordingly, the encoder can suppress an increase in the amount of transmitted data, the power consumption, and electromagnetic noise. This also makes it possible for the encoder to suppress an increase in the manufacturing cost and the device size. Furthermore, by suppressing a drop in the encoding efficiency, the subjective image quality of the decoded image can be improved for the same amount of transmitted data. In other words, the encoder can suppress a drop in the subjective image quality of the decoded image.

Note that in the present embodiment, the transmission wavelength characteristic-grid point reconfiguration image refers to an image reconfigured according to the transmission wavelength characteristic and the grid points.

<Encoding Order Alignment>

Note that the encoder may align the transmission wavelength characteristic-grid point reconfiguration images such that the same characteristic values are continuous for the transmission wavelength characteristic, and encode the transmission wavelength characteristic-grid point reconfiguration images in that order, as indicated in the third row from the top of the table in FIG. 13 (Method 2-1-1).

In other words, the encoder may encode a plurality of transmission wavelength characteristic-grid point reconfiguration images in an order based on the characteristic values of the transmission wavelength characteristic. For example, by encoding the transmission wavelength characteristic-grid point reconfiguration image 411 to the transmission wavelength characteristic-grid point reconfiguration image 426 illustrated in FIG. 15 in this order, the encoder can continuously encode transmission wavelength characteristic-grid point reconfiguration images that have the same transmission wavelength characteristic (e.g., the transmission wavelength characteristic-grid point reconfiguration image 411 and the transmission wavelength characteristic-grid point reconfiguration image 412).

Doing so makes it possible for the encoder to increase prediction that utilizes the correlation between the transmission wavelength characteristic-grid point reconfiguration images having the same characteristic values. Generally speaking, there is a high correlation between transmission wavelength characteristic-grid point reconfiguration images having the same characteristic values, and it is therefore possible for the encoder to suppress a drop in prediction accuracy between images (transmission wavelength characteristic-grid point reconfiguration images) by performing such processing. In other words, the encoder can further suppress a drop in the encoding efficiency of the RAW image.

<Encoding Method>

The encoder may encode the reconfiguration image by applying prediction utilizing the correlation among pixels, among images, or the like, for example, as indicated in the fourth row from the top of the table in FIG. 13 (Method 2-1-2).

In other words, the encoder may encode the transmission wavelength characteristic-grid point reconfiguration image using prediction that utilizes intra-image correlation or inter-image correlation. Doing so makes it possible for the encoder to further suppress a drop in the encoding efficiency of the RAW image as described above.

<3-1-2. Transmission Wavelength Characteristic Grid Point Reconfiguration Image Decoding and Development Processing>

For example, a decoder that decodes the encoded data of the RAW image may decode the encoded data and perform development processing on the obtained transmission wavelength characteristic-grid point reconfiguration image, as indicated in the fifth row from the top of the table in FIG. 13 (Method 2-2).

For example, an image processing method may include: generating, by decoding encoded data, a transmission wavelength characteristic-grid point reconfiguration image, in which a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, is reconfigured, the transmission wavelength characteristic-grid point reconfiguration image being constituted by pixel values of the pixels that have detected the incident light for which characteristic values of the transmission wavelength characteristic are the same and that have same positions in a row direction or a column direction of the pixel array; and performing development processing on the transmission wavelength characteristic-grid point reconfiguration image generated.

For example, an image processing device may include: a decoding unit that, by decoding encoded data, generates a transmission wavelength characteristic-grid point reconfiguration image, in which a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, is reconfigured, the transmission wavelength characteristic-grid point reconfiguration image being constituted by pixel values of the pixels that have detected the incident light for which characteristic values of the transmission wavelength characteristic are the same and that have same positions in a row direction or a column direction of the pixel array; and a development processing unit that performs development processing on the transmission wavelength characteristic-grid point reconfiguration image.

Figure 16:
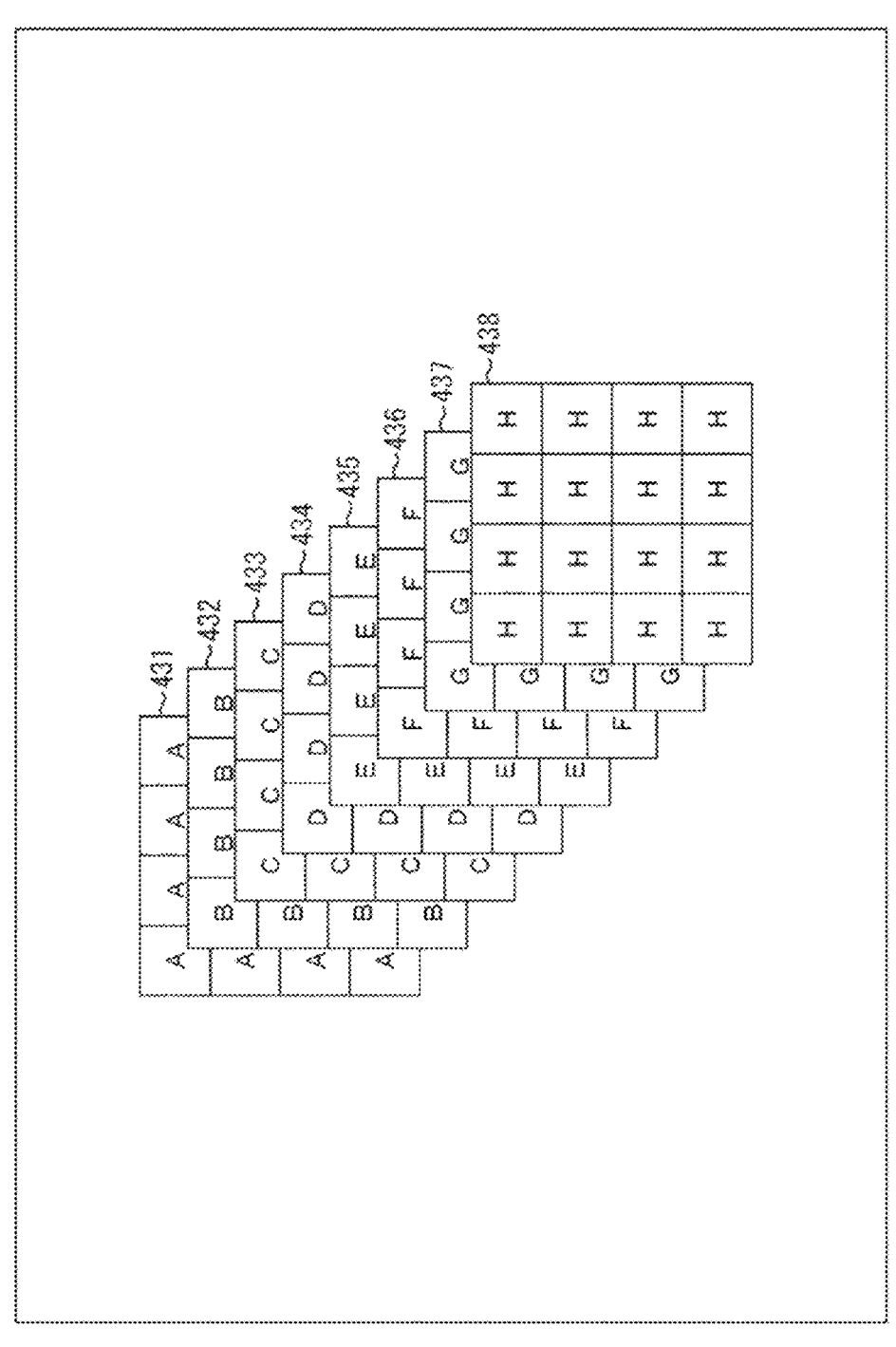
FIG. 16 is a diagram illustrating an example of a post-development image.

In other words, the decoder decodes the encoded data of the transmission wavelength characteristic-grid point reconfiguration image generated by the encoder as described above, performs development processing on the obtained transmission wavelength characteristic-grid point reconfiguration image, and generates a post-development image. For example, if the encoded data is decoded and a transmission wavelength characteristic-grid point reconfiguration image such as that illustrated in FIG. 15 is obtained, the decoder generates a post-development image 431 to a post-development image 438 (an image for each wavelength band), such as those illustrated in FIG. 16, through the development processing.

Accordingly, the decoder can correctly generate the post-development image from the encoded data generated by the encoder. The decoder can therefore suppress a drop in the encoding efficiency of the RAW image. As such, the decoder can suppress an increase in the amount of transmitted data, the power consumption, and electromagnetic noise. This also makes it possible for the decoder to suppress an increase in the manufacturing cost and the device size. Furthermore, by suppressing a drop in the encoding efficiency, the subjective image quality of the decoded image can be improved for the same amount of transmitted data. In other words, the decoder can suppress a drop in the subjective image quality of the decoded image.

<Image Processing>

Note that the decoder may perform image processing on the post-development image generated by performing the development processing on the transmission wavelength characteristic-grid point reconfiguration image, for example, as indicated in the sixth row from the top of FIG. 13 (Method 2-2-1).

The image processing may be any type of image processing. For example, the decoder may perform noise reduction processing to reduce noise in the generated post-development image, as indicated in the seventh row from the top of FIG. 13 (Method 2-2-1-1). Additionally, for example, the decoder may enlarge or reduce the generated post-development image, as indicated in the eighth row from the top of FIG. 13 (Method 2-2-1-2). By doing so, the decoder can suppress a drop in the subjective image quality of the decoded image.

<Wavelength Expansion Processing>

Furthermore, the decoder may perform wavelength expansion processing on the post-development image generated by performing the development processing on the transmission wavelength characteristic-grid point reconfiguration image, for example, as indicated in the bottommost row of FIG. 13 (Method 2-2-2).

<3-2. Multispectral Image Sensor Unit>

Figure 17:
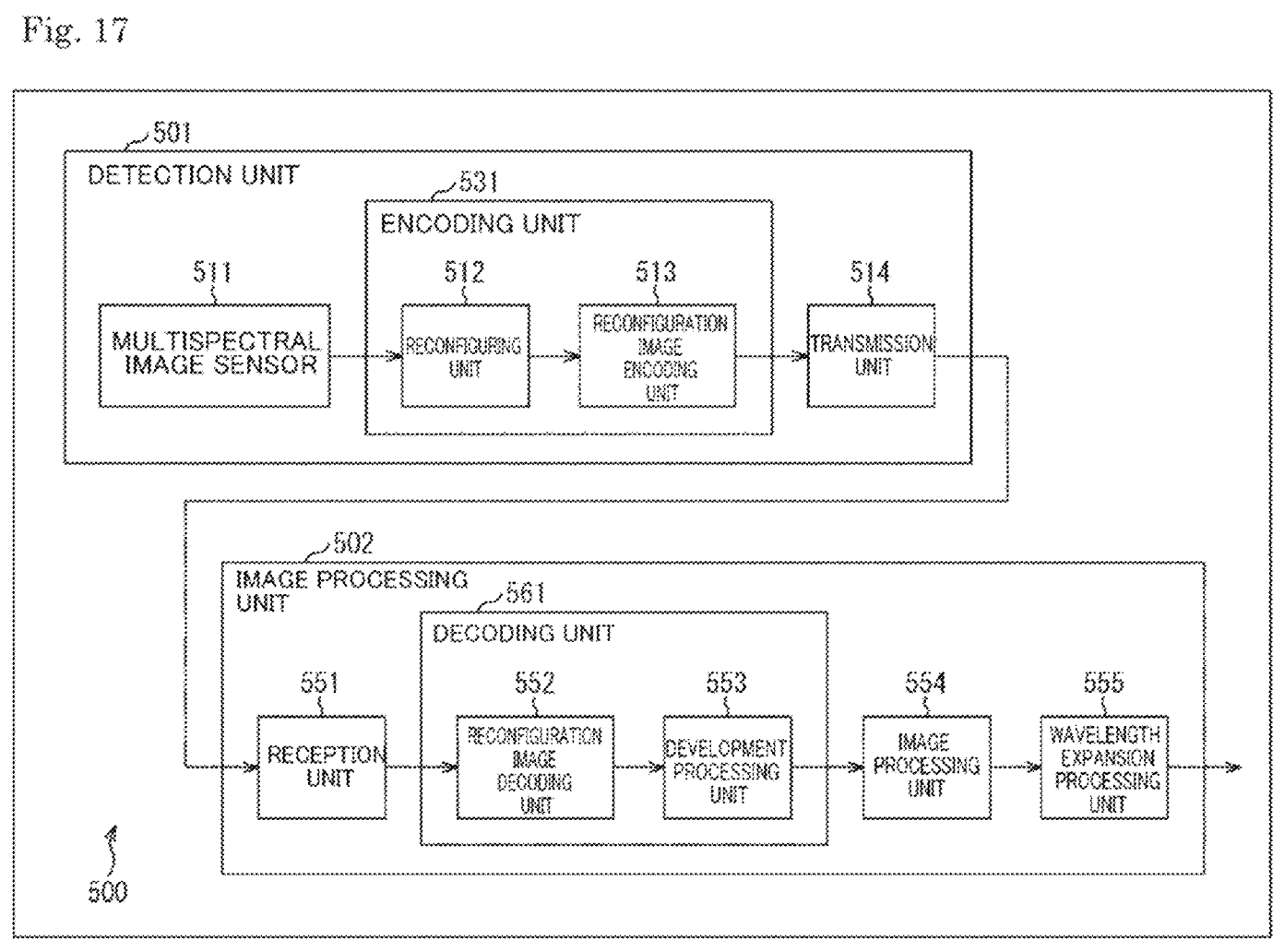

A configuration to which the present technique described above is applied in the present embodiment will be described next. FIG. 17 is a block diagram illustrating an example of the configuration of a multispectral image sensor unit serving as one aspect of the image processing device to which the present technique is applied. A multispectral image sensor unit 500 illustrated in FIG. 17 is a unit that generates a RAW image in which pixel values can be obtained for each of transmission wavelengths and pixel positions using a multispectral image sensor, and performs image processing on the RAW image.

Although FIG. 17 illustrates major components such as processing units (blocks) and data flows, the processing units and data flows are not limited to those illustrated in FIG. 17. That is, processing units not illustrated in FIG. 17 as blocks and processing and data flows not illustrated in FIG. 17 as arrows or the like may be present in the multispectral image sensor unit 500.

As illustrated in FIG. 17, the multispectral image sensor unit 500 includes a detection unit 501 and an image processing unit 502. The detection unit 501 performs detection and outputs a RAW image (encoded data encoded by reconfiguring the RAW image) as a detection result for the detection target.

The detection unit 501 includes a multispectral image sensor 511, a reconfiguring unit 512, a reconfiguration image encoding unit 513, and a transmission unit 514.

The multispectral image sensor 511 is a sensor having a pixel array constituted by a plurality of types of pixels that detect incident light having different wavelength characteristics. The multispectral image sensor 511 also has an arrangement pattern in which pixel groups constituted by a predetermined number of pixels are taken as unit groups and arranged by unit groups, as illustrated in the example in FIG. 12. In addition, the positions of the unit groups that are adjacent to each other in the row direction are offset from each other in the column direction. The multispectral image sensor 511 outputs the result of detecting the incident light as a RAW image.

By obtaining the RAW image output from the multispectral image sensor 511 and reconfiguring the RAW image according to the transmission wavelength characteristic, which is a wavelength characteristic of the incident light, and the positions of the pixels, the reconfiguring unit 512 generates a transmission wavelength characteristic-grid point reconfiguration image constituted by pixel values of pixels that have detected incident light for which characteristic values of the transmission wavelength characteristic are the same and that have same positions in the row direction or the column direction of the pixel array.

The reconfiguration image encoding unit 513 encodes the transmission wavelength characteristic-grid point reconfiguration image generated by the reconfiguring unit 512 through a predetermined encoding method, and generates encoded data. For example, the reconfiguration image encoding unit 513 may encode the transmission wavelength characteristic-grid point reconfiguration image using prediction that utilizes intra-image correlation or inter-image correlation. In addition, the reconfiguration image encoding unit 513 may encode a plurality of transmission wavelength characteristic-grid point reconfiguration images in an order based on the characteristic values of the transmission wavelength characteristic.

The transmission unit 514 transmits the encoded data generated by the reconfiguration image encoding unit 513 to the image processing unit 502.

Note that the reconfiguring unit 512 and the reconfiguration image encoding unit 513 can also be considered to be an encoding unit 531.

The image processing unit 502 performs image processing on the RAW image generated by the detection unit 501. As illustrated in FIG. 17, the image processing unit 502 includes a reception unit 551, a reconfiguration image decoding unit 552, a development processing unit 553, an image processing unit 554, and a wavelength expansion processing unit 555.

The reception unit 551 obtains the encoded data transmitted from the detection unit 501 (the transmission unit 514) and supplies the encoded data to the reconfiguration image decoding unit 552.

The reconfiguration image decoding unit 552 decodes the encoded data supplied from the reception unit 551 and generates (restores) the transmission wavelength characteristic-grid point reconfiguration image. This transmission wavelength characteristic-grid point reconfiguration image is the reconfiguration image generated by the reconfiguring unit 512 of the detection unit 501 as described above. In other words, by decoding encoded data, the reconfiguration image decoding unit 552 generates a transmission wavelength characteristic-grid point reconfiguration image, in which a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, is reconfigured, the transmission wavelength characteristic-grid point reconfiguration image being constituted by pixel values of the pixels that have detected the incident light for which characteristic values of the transmission wavelength characteristic are the same and that have same positions in a row direction or a column direction of the pixel array.

The development processing unit 553 performs development processing on the transmission wavelength characteristic-grid point reconfiguration image generated by the reconfiguration image decoding unit 552, and generates a post-development image.

The image processing unit 554 performs image processing on the post-development image generated by the development processing unit 553. The image processing may be any type of image processing. For example, the image processing unit 554 may perform processing for reducing noise as the image processing. Additionally, the image processing unit 554 may enlarge or reduce the post-development image as the image processing.

The wavelength expansion processing unit 555 performs wavelength expansion processing on the post-development image for which image processing has been performed as appropriate by the image processing unit 554. The wavelength expansion processing unit 555 outputs the post-development image after this processing to the exterior of the image processing unit 502, i.e., to the exterior of the multispectral image sensor unit 500.

Note that the reconfiguration image decoding unit 552 and the development processing unit 553 can also be considered to be a decoding unit 561.

Providing the configuration described above makes it possible for the multispectral image sensor unit 500 to further suppress a drop in the encoding efficiency of the RAW image.

<Flow of Detection Processing>

Processing performed by the multispectral image sensor unit 500 will be described next. An example of the flow of the detection processing performed by the detection unit 501 will be described with reference to the flowchart illustrated in FIG. 18.

When the detection processing starts, in step S501, the multispectral image sensor 511 detects incident light and generates a RAW image.

In step S502, the reconfiguring unit 512 reconfigures the RAW image generated in step S501 according to the transmission wavelength characteristic and the grid points, and generates a transmission wavelength characteristic-grid point reconfiguration image. In other words, from the RAW image, the reconfiguring unit 512 reconfigures an image that uses only the pixels, of pixels having the same characteristic values, that are located at the grid points in the same square grid. It is assumed that the order of the pixels in each reconfiguration transmission wavelength characteristic-grid point reconfiguration image is kept in the order of the rows and columns in the RAW image. When the arrangement of pixels having the same characteristic values are covered by a n types of square grids, a total of n×M images are generated.

In other words, by reconfiguring a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, the reconfiguring unit 512 generates a transmission wavelength characteristic-grid point reconfiguration image constituted by pixel values of the pixels that have detected the incident light for which characteristic values of the transmission wavelength characteristic are the same and that have same positions in a row direction or a column direction of the pixel array.

In step S503, the reconfiguration image encoding unit 513 aligns the transmission wavelength characteristic-grid point reconfiguration images generated in step S502 in an encoding order.

In step S504, the reconfiguration image encoding unit 513 encodes the transmission wavelength characteristic-grid point reconfiguration images in the order from step S503, and generates the encoded data. The reconfiguration image encoding unit 513 encodes the generated n×N images through an image compression method. The image compression may be performed through a method that uses correlation within the same image, or through a method that uses correlation between images. When using correlation between images, the order of the compression processing is such that for a given optical characteristic, a group of images having the same characteristic values are encoded in sequence. This strengthens the correlation between neighboring images, which makes it possible to improve the encoding performance.

In step S505, the transmission unit 314 transmits the encoded data generated through the processing of step S504 to the image processing unit 502 (the reception unit 551).

When the processing of step S505 ends, the image processing ends.

<Flow of Image Processing>

An example of the flow of the image processing performed by the image processing unit 502 will be described next with reference to the flowchart illustrated in FIG. 19.

Figure 18:
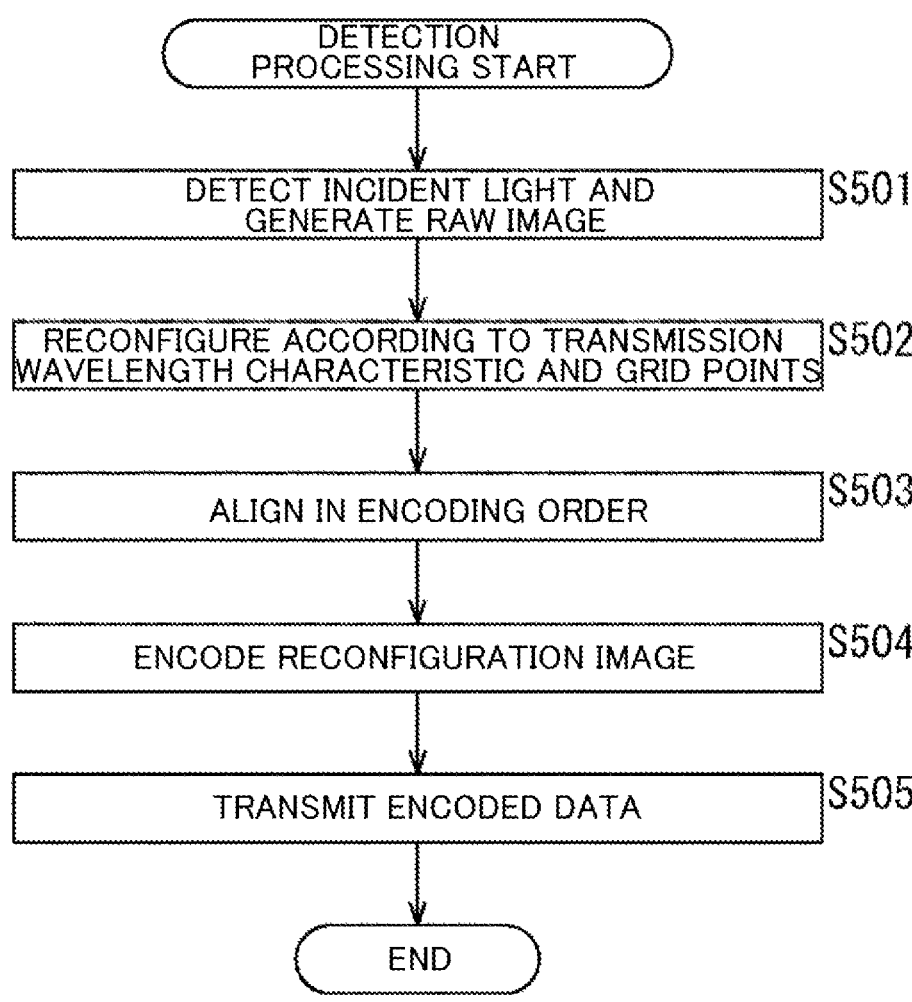
FIG. 18 is a flowchart illustrating an example of a method for detection processing.

When the image processing starts, in step S551, the reception unit 551 receives the encoded data transmitted in step S505 of FIG. 18.

In step S552, the reconfiguration image decoding unit 552 decodes the encoded data and generates (restores) the n×N transmission wavelength characteristic-grid point reconfiguration images.

In other words, by decoding encoded data, the reconfiguration image decoding unit 552 generates a transmission wavelength characteristic-grid point reconfiguration image, in which a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, is reconfigured, the transmission wavelength characteristic-grid point reconfiguration image being constituted by pixel values of the pixels that have detected the incident light for which characteristic values of the transmission wavelength characteristic are the same and that have same positions in a row direction or a column direction of the pixel array.

In step S553, the development processing unit 553 performs development processing on the transmission wavelength characteristic-grid point reconfiguration image generated in step S552, and generates a post-development image.

In step S554, the image processing unit 554 performs image processing, such as noise reduction, scaling, and the like, for example.

In step S555, the wavelength expansion processing unit 555 performs wavelength expansion processing on the post-development image subjected to the image processing in step S554.

When the processing of step S555 ends, the image processing ends.

Performing the processing described above makes it possible for the multispectral image sensor unit 500 to further suppress a drop in the encoding efficiency of the RAW image.

4. Third Embodiment

<4-1. Reconfiguration of Image According to Intra-Block Positions>

<Sensor Provided with Phase Difference Detection Pixels>

Even in an image sensor designed to obtain visual images, there are examples where pixel value levels fluctuate locally over a fixed spatial cycle due to the device structure and various other factors. For example, in a technique called image plane phase detection autofocus, phase detection pixels are disposed in an image sensor at a constant spatial cycle.

Figure 20:
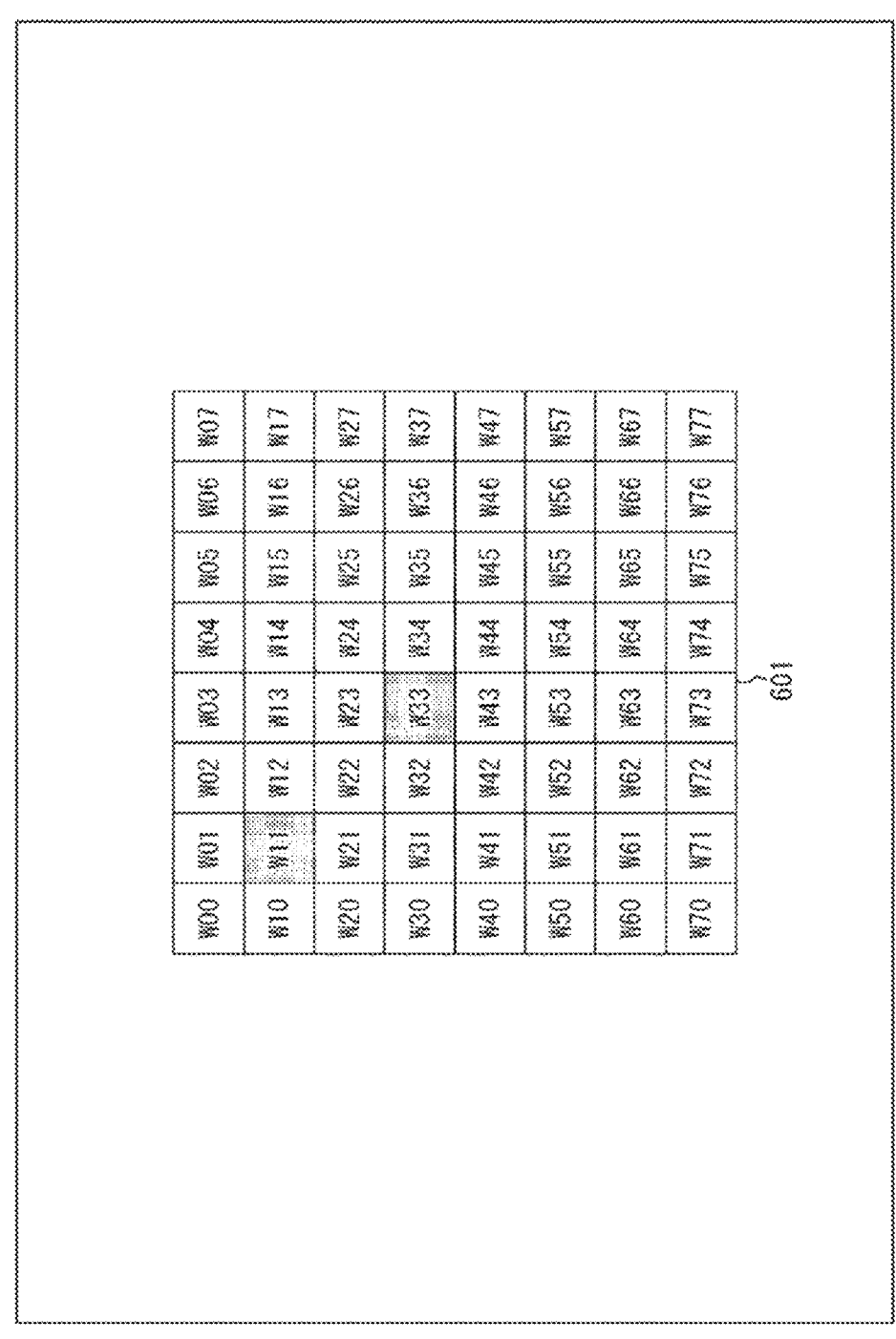
FIG. 20 is a diagram illustrating an example of the configuration of a RAW image from an image plane phase detection AF image sensor.

FIG. 20 illustrates an example of pixel blocks formed by a predetermined number of pixels in an image plane phase detection AF image sensor, which is an image sensor having phase detection pixels, and which performs image plane phase detection-based focus processing using the phase detection pixel. As illustrated in FIG. 20, phase detection pixels are provided at predetermined positions in a pixel block 601 of such an image plane phase detection AF image sensor. In the example in FIG. 20, a pixel W11 and a pixel W33, colored gray, are phase detection pixels.

Generally, phase detection pixels are, structurally speaking, less sensitive to light than normal pixels used for obtaining pixel values constituting the RAW image. As a result, the correlation between phase detection pixels and normal pixels is low, which leads to a risk of a higher spatial frequency.

When a RAW image from an image plane phase detection AF image sensor (an image sensor having phase detection pixels) provided with such a pixel layout is reconfigured separately for each color as described in PTL 1, the pixel values of the phase detection pixels are included in the reconfiguration image, which leads to a risk that the encoding efficiency of the reconfiguration image will drop.

<Use of Intra-Block Positions>

Accordingly, an image is reconfigured using intra-block positions, as indicated in the uppermost row of the table in FIG. 21 (Method 3).

For example, the pixel blocks illustrated in FIG. 20 are divided into pixels and reconfigured into reconfiguration images that are different from each other. In other words, pixels in the same positions as each other in the pixel blocks are collected and a reconfiguration image is generated.

<4-1-1. Reconfiguration of RAW Image According to Intra-Block Positions>

For example, an encoder that encodes a RAW image may reconfigure the RAW image according to the intra-block positions, and encode the image, as indicated in the second row from the top of the table in FIG. 21 (Method 3-1).

For example, an image processing method may include: generating, by reconfiguring a RAW image, the RAW image being an output of a sensor having a pixel array constituted by a plurality of types of pixels each having different light reception sensitivities, according to intra-block positions that are pixel positions within a pixel block constituted by a predetermined number of the pixels including the plurality of types of pixels, an intra-block position reconfiguration image constituted by pixel values of the pixels having the same intra-block positions; and encoding the intra-block position reconfiguration image generated.

For example, an image processing device may include: a reconfiguring unit that, by reconfiguring a RAW image, the RAW image being an output of a sensor having a pixel array constituted by a plurality of types of pixels each having different light reception sensitivities, according to intra-block positions that are pixel positions within a pixel block constituted by a predetermined number of the pixels including the plurality of types of pixels, generates an intra-block position reconfiguration image constituted by pixel values of the pixels having the same intra-block positions; and an encoding unit that encodes the intra-block position reconfiguration image.

In other words, by reconfiguring the pixel values of a RAW image, output from a sensor having a pixel array constituted by a plurality of types of pixels each having different light reception sensitivities, according to intra-block positions, the encoder generates an intra-block position reconfiguration image constituted by pixel values of the pixels having the same intra-block positions. For example, the encoder reconfigures the RAW image having the pixel block 601 as illustrated in FIG. 20, and generates an intra-block position reconfiguration image 611-1 to an intra-block position reconfiguration image 611-62, which are the reconfiguration images for each intra-block position as illustrated in FIG. 22, as well as an intra-block position reconfiguration image 612-1 and an intra-block position reconfiguration image 612-2.

Figure 22:
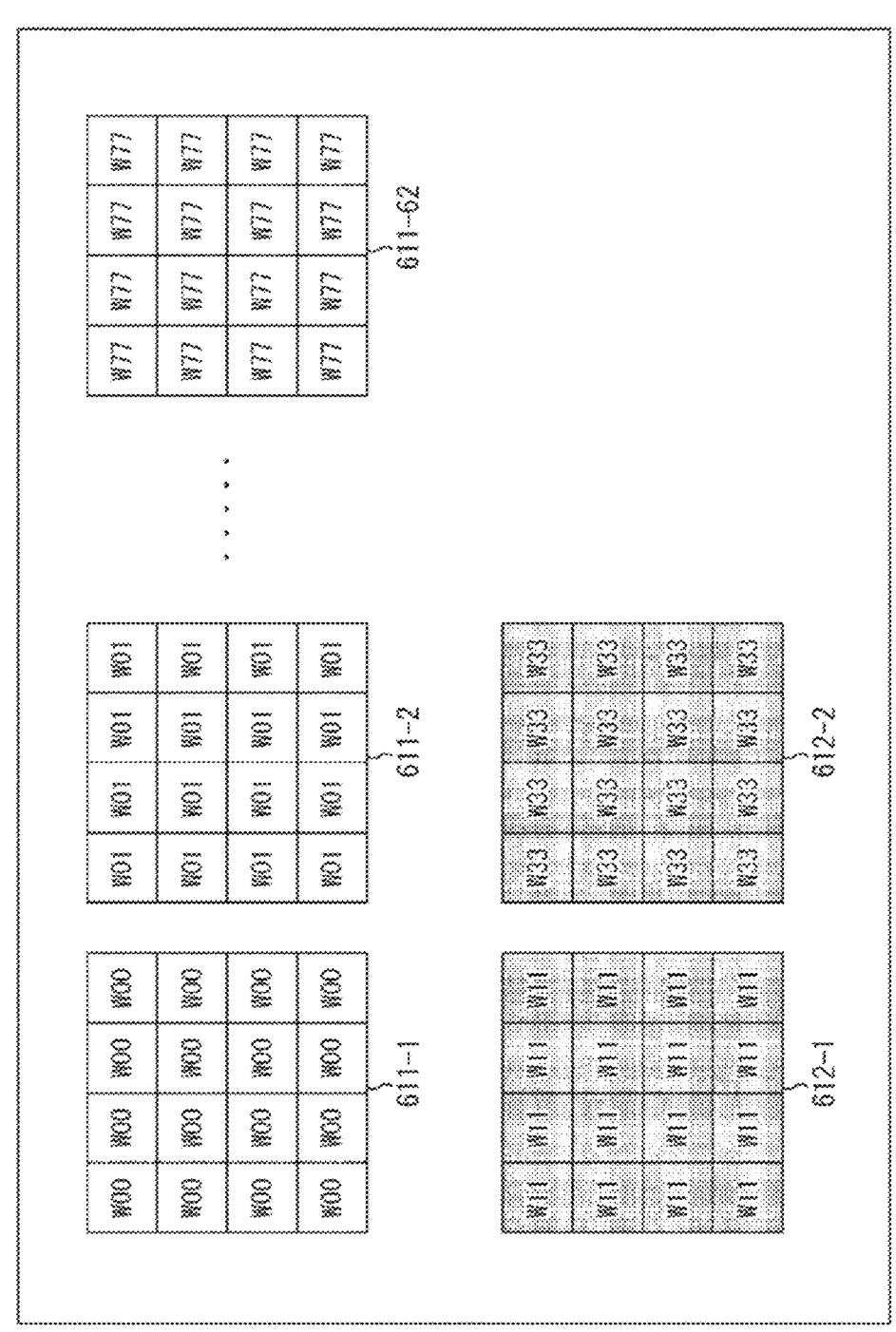
FIG. 22 is a diagram illustrating an example of an intra-block position reconfiguration image.

In FIG. 22, the intra-block position reconfiguration image 611-1 to the intra-block position reconfiguration image 611-62 are normal pixel reconfiguration images. The intra-block position reconfiguration image 612-1 and the intra-block position reconfiguration image 612-2 are phase detection pixel reconfiguration images. In other words, doing so makes it possible for the encoder to reconfigure pixel values having different light reception sensitivities into reconfiguration images that are different from each other.

Then, the encoder encodes the intra-block position reconfiguration images.

Doing so makes it possible for the encoder to generate a reconfiguration image in which pixels having different light reception sensitivities are assigned to different images. Accordingly, the encoder can suppress a drop in the prediction accuracy caused by differences in the light reception sensitivities. Through this, the encoder can suppress a drop in the encoding efficiency of the RAW image. Accordingly, the encoder can suppress an increase in the amount of transmitted data, the power consumption, and electromagnetic noise. This also makes it possible for the encoder to suppress an increase in the manufacturing cost and the device size. Furthermore, by suppressing a drop in the encoding efficiency, the subjective image quality of the decoded image can be improved for the same amount of transmitted data. In other words, the encoder can suppress a drop in the subjective image quality of the decoded image.

Note that in the present embodiment, "intra-block position reconfiguration image" refers to an image reconfigured according to the intra-block positions.

<Encoding Order Alignment>

Note that the encoder may align the intra-block position reconfiguration images such that the same characteristic values are continuous for the light reception sensitivity characteristic, and encode the intra-block position reconfiguration images in that order, as indicated in the third row from the top of the table in FIG. 21 (Method 3-1-1).

In other words, the encoder may encode a plurality of the intra-block position reconfiguration images in an order based on the light reception sensitivities. For example, the encoder may continuously encode the intra-block position reconfiguration image 611-1 to the intra-block position reconfiguration image 611-62 illustrated in FIG. 22, and then encode the intra-block position reconfiguration image 612-1 and the intra-block position reconfiguration image 612-2. Doing so makes it possible for the encoder to continuously encode intra-block position reconfiguration images having the same light reception sensitivity characteristics.

Doing so makes it possible for the encoder to increase prediction that utilizes the correlation between the intra-block position reconfiguration image having the same characteristic values. Generally speaking, there is a high correlation between intra-block position reconfiguration images having the same light reception sensitivity, and it is therefore possible for the encoder to suppress a drop in prediction accuracy between images (intra-block position reconfiguration images) by performing such processing. In other words, the encoder can further suppress a drop in the encoding efficiency of the RAW image.

<Encoding Method>

The encoder may encode the reconfiguration image by applying prediction utilizing the correlation among pixels, among images, or the like, for example, as indicated in the fourth row from the top of the table in FIG. 21 (Method 3-1-2).

In other words, the encoder may encode the intra-block position reconfiguration image using prediction that utilizes intra-image correlation or inter-image correlation. Doing so makes it possible for the encoder to further suppress a drop in the encoding efficiency of the RAW image as described above.

<4-1-2. Intra-Block Position Reconfiguration Image Decoding and Development Processing>

For example, a decoder that decodes the encoded data of the RAW image may decode the encoded data and perform development processing on the obtained intra-block position reconfiguration image, as indicated in the fifth row from the top of the table in FIG. 21 (Method 3-2).

For example, an image processing method may include: generating, by decoding encoded data, an intra-block position reconfiguration image in which a RAW image, the RAW image being an output of a sensor having a pixel array constituted by a plurality of types of pixels each having different light reception sensitivities, is reconfigured according to intra-block positions that are pixel positions within a pixel block constituted by a predetermined number of the pixels including the plurality of types of pixels, the intra-block position reconfiguration image being constituted by pixel values of the pixels having same intra-block positions; and performing development processing on the intra-block position reconfiguration image generated.

For example, an image processing device may include: a decoding unit that, by decoding encoded data, generates an intra-block position reconfiguration image in which a RAW image, the RAW image being an output of a sensor having a pixel array constituted by a plurality of types of pixels each having different light reception sensitivities, is reconfigured according to intra-block positions that are pixel positions within a pixel block constituted by a predetermined number of the pixels including the plurality of types of pixels, the intra-block position reconfiguration image being constituted by pixel values of the pixels having same intra-block positions; and a development processing unit that performs development processing on the intra-block position reconfiguration image.

Figure 23:
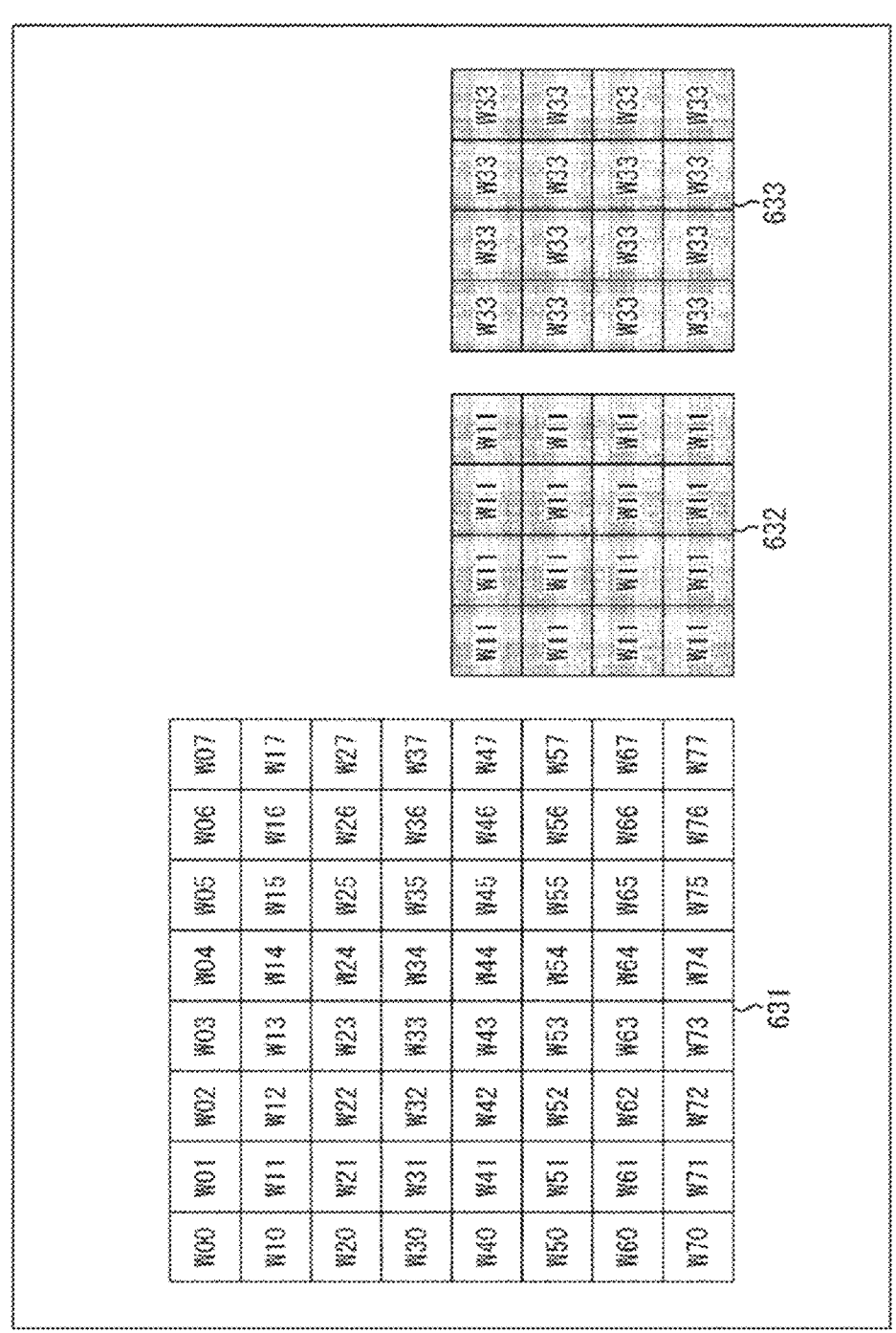
FIG. 23 is a diagram illustrating an example of a post-development image.

In other words, the decoder decodes the encoded data of the intra-block position reconfiguration image generated by the encoder as described above, performs development processing on the obtained intra-block position reconfiguration image, and generates a post-development image. For example, if the encoded data is decoded and an intra-block position reconfiguration image such as that illustrated in FIG. 22 is obtained, the decoder generates a post-development image 631 to a post-development image 633 (an image for each light reception sensitivity), such as those illustrated in FIG. 23, through the development processing.

Accordingly, the decoder can correctly generate the post-development image from the encoded data generated by the encoder. The decoder can therefore suppress a drop in the encoding efficiency of the RAW image. As such, the decoder can suppress an increase in the amount of transmitted data, the power consumption, and electromagnetic noise. This also makes it possible for the decoder to suppress an increase in the manufacturing cost and the device size. Furthermore, by suppressing a drop in the encoding efficiency, the subjective image quality of the decoded image can be improved for the same amount of transmitted data. In other words, the decoder can suppress a drop in the subjective image quality of the decoded image.

<Image Processing>

Note that the decoder may perform image processing on the post-development image generated by performing the development processing on the intra-block position reconfiguration image, for example, as indicated in the sixth row from the top of FIG. 21 (Method 3-2-1).

The image processing may be any type of image processing. For example, the decoder may perform noise reduction processing to reduce noise in the generated post-development image, as indicated in the seventh row from the top of FIG. 21 (Method 3-2-1-1). Additionally, for example, the decoder may enlarge or reduce the generated post-development image, as indicated in the eighth row from the top of FIG. 21 (Method 3-2-1-2). By doing so, the decoder can suppress a drop in the subjective image quality of the decoded image.

<Focus Processing>

Furthermore, the decoder may perform focus processing on the image sensor using the post-development image of the phase difference detection pixels generated by performing the development processing on the intra-block position reconfiguration images, for example, as indicated in the bottom row of FIG. 21 (Method 3-2-2).

<4-2. Image Plane Phase Detection AF Image Sensor Unit>

Figure 24:
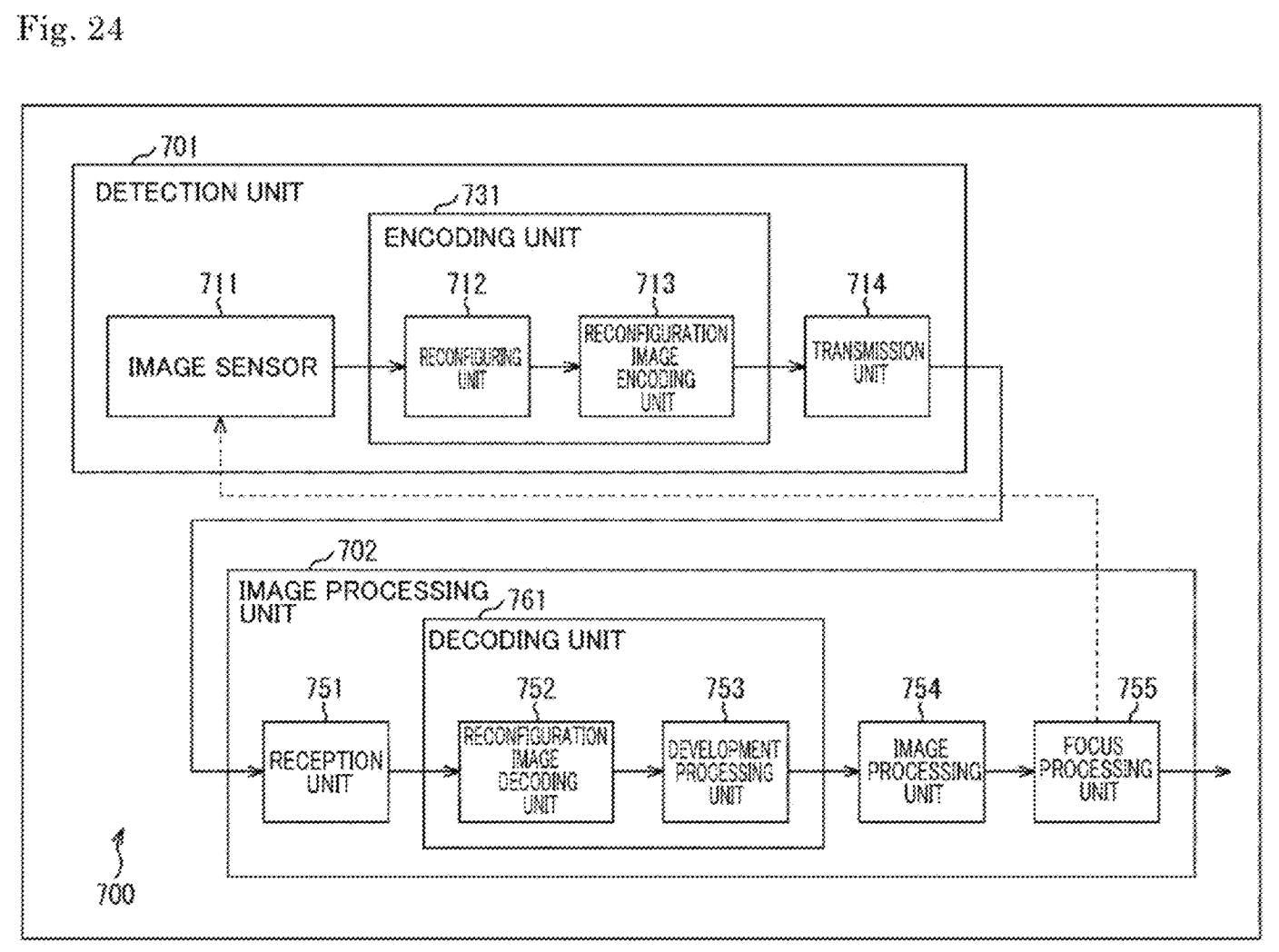

A configuration to which the present technique described above is applied in the present embodiment will be described next. FIG. 24 is a block diagram illustrating an example of the configuration of an image plane phase detection AF image sensor unit serving as one aspect of the image processing device to which the present technique is applied. An image plane phase detection AF image sensor unit 700 illustrated in FIG. 24 is a unit that generates a RAW image using an image plane phase detection AF image sensor and performs image processing on the RAW image. Note that the image plane phase detection AF image sensor includes phase detection pixels. The image plane phase detection AF image sensor unit 700 can perform image plane phase detection-based focus processing using the phase detection pixels.

Although FIG. 24 illustrates major components such as processing units (blocks) and data flows, the processing units and data flows are not limited to those illustrated in FIG. 24. That is, processing units not illustrated in FIG. 24 as blocks and processing and data flows not illustrated in FIG. 24 as arrows or the like may be present in the image plane phase detection AF image sensor unit 700.

As illustrated in FIG. 24, the image plane phase detection AF image sensor unit 700 includes a detection unit 701 and an image processing unit 702. The detection unit 701 performs detection and outputs a RAW image (encoded data encoded by reconfiguring the RAW image) as a detection result for the detection target.

The detection unit 701 includes an image sensor 711, a reconfiguring unit 712, a reconfiguration image encoding unit 713, and a transmission unit 714.

The image sensor 711 is a sensor having a pixel array constituted by pixels that detect incident light. The image sensor 711 outputs the result of detecting the incident light as a RAW image. The pixel array also includes phase detection pixels. In other words, the image sensor 711 is a sensor having a pixel array constituted by a plurality of types of pixels having different light reception sensitivities. The image sensor 711 can perform image plane phase detection-based focus processing using the pixel values of the phase detection pixels.

By obtaining a RAW image output from the image sensor 711 and reconfiguring the RAW image according to intra-block positions that are pixel positions within a pixel block constituted by a predetermined number of pixels including a plurality of types of pixels, the reconfiguring unit 712 generates an intra-block position reconfiguration image constituted by pixel values of the pixels having the same intra-block positions.

The reconfiguration image encoding unit 713 encodes the intra-block position reconfiguration image generated by the reconfiguring unit 712 through a predetermined encoding method, and generates encoded data. For example, the reconfiguration image encoding unit 713 may encode the intra-block position reconfiguration image using prediction that utilizes intra-image correlation or inter-image correlation. In addition, the reconfiguration image encoding unit 713 may encode a plurality of intra-block position reconfiguration images in an order based on the light reception sensitivities.

The transmission unit 714 transmits the encoded data generated by the reconfiguration image encoding unit 713 to the image processing unit 702.

Note that the reconfiguring unit 712 and the reconfiguration image encoding unit 713 can also be considered to be an encoding unit 731.

The image processing unit 702 performs image processing on the RAW image generated by the detection unit 701. As illustrated in FIG. 24, the image processing unit 702 includes a reception unit 751, a reconfiguration image decoding unit 752, a development processing unit 753, an image processing unit 754, and a focus processing unit 755.

The reception unit 751 obtains the encoded data transmitted from the detection unit 701 (the transmission unit 714) and supplies the encoded data to the reconfiguration image decoding unit 752.

The reconfiguration image decoding unit 752 decodes the encoded data supplied from the reception unit 751 and generates (restores) the intra-block position reconfiguration image. This intra-block position reconfiguration image is the reconfiguration image generated by the reconfiguring unit 712 of the detection unit 701 as described above. In other words, by reconfiguring a RAW image, the RAW image being an output of a sensor having a pixel array constituted by a plurality of types of pixels each having different light reception sensitivities, according to intra-block positions that are pixel positions within a pixel block constituted by a predetermined number of the pixels including the plurality of types of pixels, the reconfiguration image decoding unit 752 generates an intra-block position reconfiguration image constituted by pixel values of the pixels having the same intra-block positions.

The development processing unit 753 performs development processing on the intra-block position reconfiguration image generated by the reconfiguration image decoding unit 752, and generates a post-development image.

The image processing unit 754 performs image processing on the post-development image generated by the development processing unit 753. The image processing may be any type of image processing. For example, the image processing unit 754 may perform processing for reducing noise as the image processing. Additionally, the image processing unit 754 may enlarge or reduce the post-development image as the image processing.

The focus processing unit 755 controls the image sensor 711 using the post-development image of the phase detection pixels, and performs focus processing for focusing the focal point of the image sensor 711 on a subject. The focus processing unit 755 outputs the post-development image to the exterior of the image processing unit 702, i.e., to the exterior of the image plane phase detection AF image sensor unit 700.

Note that the reconfiguration image decoding unit 752 and the development processing unit 753 can also be considered to be a decoding unit 761.

Providing the configuration described above makes it possible for the image plane phase detection AF image sensor unit 700 to further suppress a drop in the encoding efficiency of the RAW image.

<Flow of Detection Processing>

Processing performed by the image plane phase detection AF image sensor unit 700 will be described next. An example of the flow of the detection processing performed by the detection unit 701 will be described with reference to the flowchart illustrated in FIG. 25.

When the detection processing starts, in step S701, the image sensor 711 detects incident light and generates a RAW image.

In step S702, the reconfiguring unit 712 reconfigures the RAW image generated in step S701 according to the intra-block positions, and generates an intra-block position reconfiguration image. In other words, by reconfiguring the RAW image according to intra-block positions that are pixel positions within a pixel block constituted by a predetermined number of pixels including a plurality of types of pixels, the reconfiguring unit 712 generates an intra-block position reconfiguration image constituted by pixel values of the pixels having the same intra-block positions. In other words, for a group of pixels in M rows and N columns constituting a cycle, an image that uses only pixels located in the same row and same column within the group of pixels is reconfigured. It is assumed that the order of the pixels in each reconfiguration image is kept in the order of the rows and columns in the RAW image. In total, M×N images are generated.

In other words, by reconfiguring a RAW image, the RAW image being an output of a sensor having a pixel array constituted by a plurality of types of pixels each having different light reception sensitivities, according to intra-block positions that are pixel positions within a pixel block constituted by a predetermined number of the pixels including the plurality of types of pixels, the reconfiguring unit 712 generates an intra-block position reconfiguration image constituted by pixel values of the pixels having same intra-block positions.

In step S703, the reconfiguration image encoding unit 713 aligns the intra-block position reconfiguration images generated in step S702 in an encoding order.

In step S704, the reconfiguration image encoding unit 713 encodes the intra-block position reconfiguration images in the order from step S703, and generates the encoded data. The reconfiguration image encoding unit 713 encodes the generated M×N images through an image compression method. The image compression may be performed through a method that uses correlation within the same image, or through a method that uses correlation between images. When using correlation between images, the order of the compression processing is such that for a given optical characteristic, a group of images having the same characteristic values are encoded in sequence. This strengthens the correlation between neighboring images, which makes it possible to improve the encoding performance.

In step S705, the transmission unit 714 transmits the encoded data generated through the processing of step S704 to the image processing unit 702 (the reception unit 751).

When the processing of step S705 ends, the image processing ends.

<Flow of Image Processing>

Figure 26:
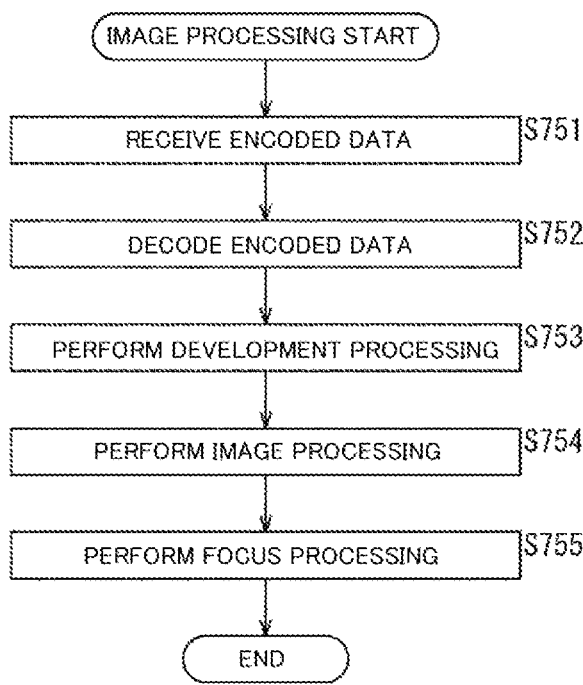
FIG. 26 is a flowchart illustrating an example of a method for image processing.

An example of the flow of the image processing performed by the image processing unit 702 will be described next with reference to the flowchart illustrated in FIG. 26.

Figure 25:
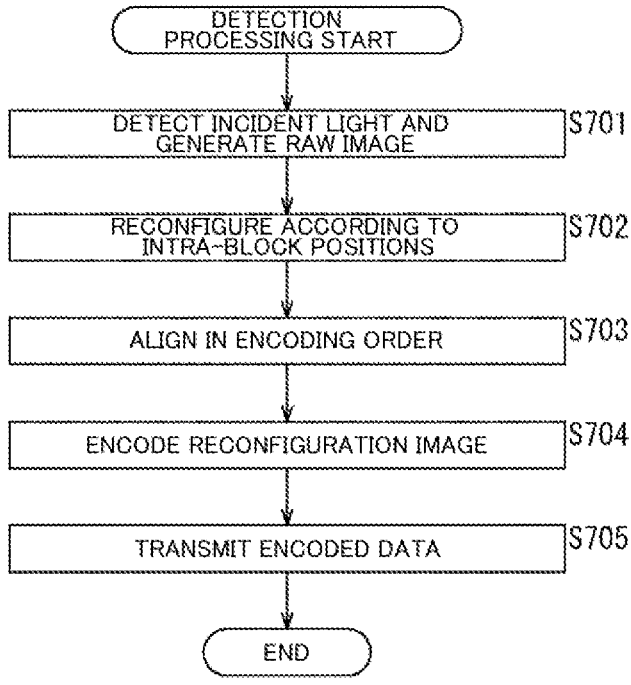
FIG. 25 is a flowchart illustrating an example of a method for detection processing.

When the image processing starts, in step S751, the reception unit 751 receives the encoded data transmitted in step S705 of FIG. 25.

In step S752, the reconfiguration image decoding unit 752 decodes the encoded data and generates (restores) the M×N intra-block position reconfiguration images.

In other words, by decoding encoded data, the reconfiguration image decoding unit 752 generates an intra-block position reconfiguration image in which a RAW image, the RAW image being an output of a sensor having a pixel array constituted by a plurality of types of pixels each having different light reception sensitivities, is reconfigured according to intra-block positions that are pixel positions within a pixel block constituted by a predetermined number of the pixels including the plurality of types of pixels, the intra-block position reconfiguration image being constituted by pixel values of the pixels having the same intra-block positions.

In step S753, the development processing unit 753 performs development processing on the intra-block position reconfiguration image generated in step S752, and generates a post-development image.

In step S754, the image processing unit 754 performs image processing, such as noise reduction, scaling, and the like, for example.

In step S755, the focus processing unit 755 performs focus processing for focusing the focal point of the image sensor 711 on a subject using the post-development image configured by the phase detection pixels generated in step S753.

When the processing of step S755 ends, the image processing ends.

Performing the processing described above makes it possible for the image plane phase detection AF image sensor unit 700 to further suppress a drop in the encoding efficiency of the RAW image.

5. Combinations

The present technique as described above in each of the first embodiment, the second embodiment, and the third embodiment may be applied in combination as appropriate.

Combination of First Embodiment and Second Embodiment

For example, the first embodiment described an encoder that, by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, generates a polarization angle characteristic reconfiguration image constituted by pixel values of the pixels that have detected the incident light for which characteristic values of at least the polarization angle characteristic are the same; and encodes the polarization angle characteristic reconfiguration image generated.

As described in the second embodiment, this encoder may generate a transmission wavelength characteristic-grid point reconfiguration image constituted by pixel values of the pixels that have detected the incident light for which characteristic values of the transmission wavelength characteristic are the same and that have same positions in a row direction or a column direction of the pixel array by reconfiguring the RAW image according to the transmission wavelength characteristic and the positions of the pixels, and generate the polarization angle characteristic reconfiguration image by reconfiguring the transmission wavelength characteristic-grid point reconfiguration image according to the polarization angle characteristic.

For example, in the polarization sensor unit 300 in FIG. 9, the reconfiguring unit 312 may have the reconfiguring unit 512 in FIG. 17 instead of the transmission wavelength characteristic reconfiguring unit 321, and by reconfiguring the RAW image according to the transmission wavelength characteristic, which is the wavelength characteristic of the incident light, and the positions of the pixels, the reconfiguring unit 512 may generate a transmission wavelength characteristic-grid point reconfiguration image constituted by pixel values of the pixels that have detected incident light for which characteristic values of the transmission wavelength characteristic are the same and that have the same positions in the row direction or the column direction of the pixel array. The polarization angle characteristic reconfiguring unit 322 may generate the polarization angle characteristic reconfiguration image by reconfiguring the transmission wavelength characteristic-grid point reconfiguration image according to the polarization angle characteristic.

Also, for example, in step S302 of FIG. 10, the reconfiguring unit 512 may reconfigure the RAW image according to the transmission wavelength characteristic and the grid points, and generate a transmission wavelength characteristic-grid point reconfiguration image, in the same manner as in step S502 of FIG. 18. Then, in step S303 of FIG. 10, the reconfiguring unit 312 (the polarization angle characteristic reconfiguring unit 322) may reconfigure the transmission wavelength characteristic-grid point reconfiguration image according to the polarization angle characteristic, and generate a polarization angle characteristic reconfiguration image.

In such a case as well, the polarization sensor unit 300 can further suppress a drop in the encoding efficiency of the RAW image, as in the case of the first embodiment.

Note that in this case as well, the encoder may encode a plurality of polarization angle characteristic reconfiguration images in an order based on the characteristic values of the transmission wavelength characteristic. In other words, in the polarization sensor unit 300 of FIG. 9, the reconfiguration image encoding unit 313 may encode a plurality of polarization angle characteristic reconfiguration images in an order based on the characteristic values of the transmission wavelength characteristic.

For example, the first embodiment described a decoder that, by decoding encoded data, generates a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and performs development processing on the polarization angle characteristic reconfiguration image generated.

As described in the second embodiment, in this decoder, the above-described optical characteristics may further include a transmission wavelength characteristic that is a wavelength characteristic of the incident light, and the above-described polarization angle characteristic reconfiguration image may be an image in which the RAW image is reconfigured according to the transmission wavelength characteristic and the positions of the pixels, and is further reconfigured according to the polarization angle characteristic.

For example, in the polarization sensor unit 300 in FIG. 9, the polarization angle characteristic reconfiguration image generated by the reconfiguration image decoding unit 352 decoding the encoded data may be an image in which a RAW image has been reconfigured according to the transmission wavelength characteristic and the positions of the pixels, and has been further reconfigured according to the polarization angle characteristic.

Figure 11:
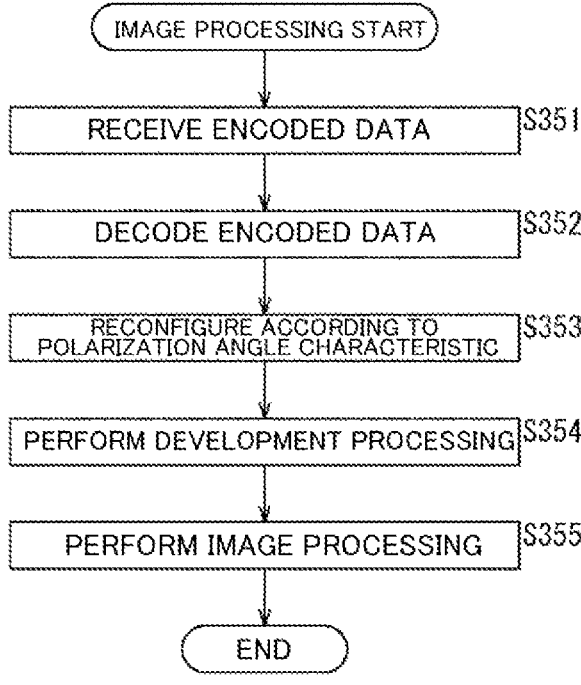
FIG. 11 is a flowchart illustrating an example of a method for image processing.

Additionally, for example, in step S352 in FIG. 11, the polarization angle characteristic reconfiguration image generated by the reconfiguration image decoding unit 352 decoding the encoded data may be an image in which a RAW image has been reconfigured according to the transmission wavelength characteristic and the positions of the pixels, and has been further reconfigured according to the polarization angle characteristic.

In such a case as well, the polarization sensor unit 300 can further suppress a drop in the encoding efficiency of the RAW image, as in the case of the first embodiment.

In this case, as described in the second embodiment, the decoder may perform wavelength expansion processing on the post-development image.

For example, the image processing unit 302 of the polarization sensor unit 300 in FIG. 9 may include the wavelength expansion processing unit 555 illustrated in FIG. 17 in a stage after the image processing unit 355. Additionally, in the image processing illustrated in FIG. 11, the focus processing unit 755 may perform the processing of step S555 in FIG. 19 after the processing of step S355.

Combination of First Embodiment and Third Embodiment

Additionally, as described in the third embodiment, the encoder described in the first embodiment may generate an intra-block position reconfiguration image constituted by pixel values of pixels having the same intra-block positions by reconfiguring a RAW image according to intra-block positions that are pixel positions within a pixel block constituted by a predetermined number of pixels having a plurality of types of light reception sensitivities, and generate the polarization angle characteristic reconfiguration image by reconfiguring the intra-block reconfiguration image according to the polarization angle characteristics.

For example, in the polarization sensor unit 300 in FIG. 9, the reconfiguring unit 312 may have the reconfiguring unit 712 in FIG. 24 instead of the transmission wavelength characteristic reconfiguring unit 321, and by reconfiguring the RAW image according to intra-block positions that are pixel positions within a pixel block constituted by a predetermined number of pixels having a plurality of types of light reception sensitivities, the reconfiguring unit 712 may generate an intra-block position reconfiguration image constituted by pixel values of pixels having the same intra-block positions. The polarization angle characteristic reconfiguring unit 322 may generate the polarization angle characteristic reconfiguration image by reconfiguring the intra-block position reconfiguration image according to the polarization angle characteristic.

Additionally, for example, in step S302 of FIG. 10, the reconfiguring unit 512 may reconfigure the RAW image according to the intra-block positions, and generate an intra-block position reconfiguration image, in the same manner as in step S702 of FIG. 25. Then, in step S303 of FIG. 10, the reconfiguring unit 312 (the polarization angle characteristic reconfiguring unit 322) may reconfigure the intra-block position reconfiguration image according to the polarization angle characteristic, and generate a polarization angle characteristic reconfiguration image.

In such a case as well, the polarization sensor unit 300 can further suppress a drop in the encoding efficiency of the RAW image, as in the case of the first embodiment.

Note that in this case, the encoder may encode a plurality of polarization angle characteristic reconfiguration images in an order based on the light reception sensitivities. In other words, in the polarization sensor unit 300 of FIG. 9, the reconfiguration image encoding unit 313 may encode a plurality of polarization angle characteristic reconfiguration images in an order based on the light reception sensitivities.

Additionally, for example, in the decoder described above in the first embodiment, as described in the third embodiment, the polarization angle characteristic reconfiguration image may be an image in which the RAW image is reconfigured according to intra-block positions that are pixel positions within a pixel block constituted by a predetermined number of pixels having a plurality of types of light reception sensitivities, and further reconfigured according to the polarization angle characteristic.

For example, in the polarization sensor unit 300 in FIG. 9, the polarization angle characteristic reconfiguration image generated by the reconfiguration image decoding unit 352 decoding the encoded data may be an image in which a RAW image has been reconfigured according to the intra-block positions, and has been further reconfigured according to the polarization angle characteristic.

Additionally, for example, in step S352 in FIG. 11, the polarization angle characteristic reconfiguration image generated by the reconfiguration image decoding unit 352 decoding the encoded data may be an image in which a RAW image has been reconfigured according to the intra-block positions, and has been further reconfigured according to the polarization angle characteristic.

In such a case as well, the polarization sensor unit 300 can further suppress a drop in the encoding efficiency of the RAW image, as in the case of the first embodiment.

In this case as well, as described in the third embodiment, the decoder may perform focus processing based on the post-development image.

For example, the image processing unit 302 of the polarization sensor unit 300 in FIG. 9 may include the focus processing unit 755 illustrated in FIG. 24 in a stage after the image processing unit 355. Additionally, in the image processing illustrated in FIG. 11, the focus processing unit 755 may perform the processing of step S755 in FIG. 26 after the processing of step S355.

Combination of Second Embodiment and Third Embodiment

Additionally, the second embodiment described an encoder that generates, by reconfiguring a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, a transmission wavelength characteristic-grid point reconfiguration image constituted by pixel values of the pixels that have detected the incident light for which characteristic values of the transmission wavelength characteristic are the same and that have same positions in a row direction or a column direction of the pixel array; and encodes the wavelength characteristic grid point reconfiguration image generated.

As described in the third embodiment, by reconfiguring the RAW image according to intra-block positions that are pixel positions within a pixel block constituted by a predetermined number of the pixels having a plurality of types of light reception sensitivities, the encoder may generate an intra-block position reconfiguration image constituted by pixel values of the pixels having same ones of the intra-block positions, and generate the transmission wavelength characteristic-grid point reconfiguration image by reconfiguring the intra-block reconfiguration image according to the transmission wavelength characteristic and the positions of the pixels.

For example, in the multispectral image sensor unit 500 in FIG. 17, the reconfiguring unit 512 may, by reconfiguring the RAW image according to intra-block positions that are pixel positions within a pixel block constituted by a predetermined number of pixels having a plurality of types of light reception sensitivities, may generate an intra-block position reconfiguration image constituted by pixel values of pixels having the same intra-block positions, like the reconfiguring unit 712 illustrated in FIG. 24. Furthermore, the reconfiguring unit 512 may generate a transmission wavelength characteristic-grid point reconfiguration image by reconfiguring the intra-block reconfiguration image according to the transmission wavelength characteristic and the positions of the pixels.

Additionally, for example, in step S502 of FIG. 18, the reconfiguring unit 512 may reconfigure the RAW image according to the intra-block positions, and generate an intra-block position reconfiguration image, in the same manner as in step S702 of FIG. 25. The reconfiguring unit 512 may then further generate a transmission wavelength characteristic-grid point reconfiguration image by reconfiguring the intra-block reconfiguration image according to the transmission wavelength characteristic and the positions of the pixels.

In such a case as well, the multispectral image sensor unit 500 can further suppress a drop in the encoding efficiency of the RAW image, as in the case of the second embodiment.

Note that in this case, the encoder may encode a plurality of transmission wavelength characteristic-grid point reconfiguration images in an order based on the light reception sensitivities. In other words, in the multispectral image sensor unit 500 in FIG. 17, the reconfiguration image encoding unit 513 may encode a plurality of transmission wavelength characteristic grid point reconfiguration images in an order based on the light reception sensitivities.

Additionally, for example, in the decoder described above in the second embodiment, as described in the third embodiment, the transmission wavelength characteristic-grid point reconfiguration image may be an image in which the RAW image is reconfigured according to intra-block positions that are pixel positions within a pixel block constituted by a predetermined number of pixels having a plurality of types of light reception sensitivities, and further reconfigured according to the transmission wavelength characteristic and the positions of the pixels.

For example, in the multispectral image sensor unit 500 in FIG. 17, the transmission wavelength characteristic-grid point reconfiguration image generated by the reconfiguration image decoding unit 552 decoding the encoded data may be an image in which the RAW image has been reconfigured according to the intra-block positions, and has been further reconfigured according to the transmission wavelength characteristic and the positions of the pixels.

Figure 19:
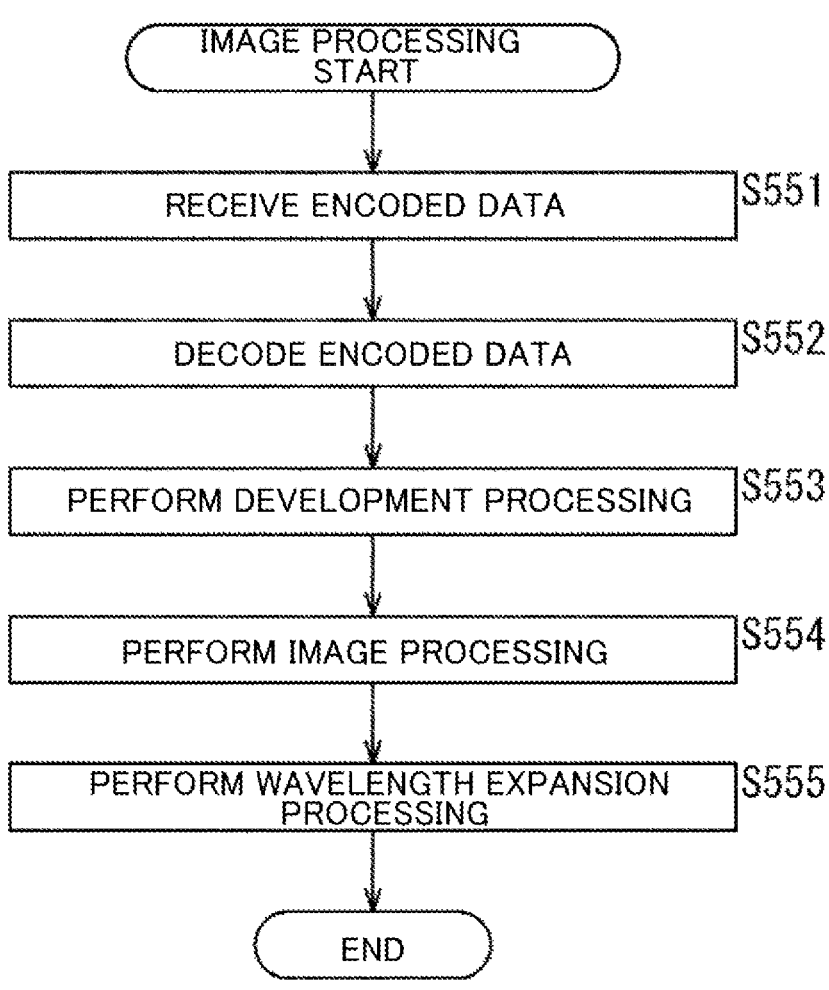
FIG. 19 is a flowchart illustrating an example of a method for image processing.

For example, in step S552 in FIG. 19, the transmission wavelength characteristic-grid point reconfiguration image generated by the reconfiguration image decoding unit 552 decoding the encoded data may be an image in which the RAW image has been reconfigured according to the intra-block positions, and has been further reconfigured according to the transmission wavelength characteristic and the positions of the pixels.

In such a case as well, the multispectral image sensor unit 500 can further suppress a drop in the encoding efficiency of the RAW image, as in the case of the second embodiment.

In this case as well, as described in the third embodiment, the decoder may perform focus processing based on the post-development image.

For example, the image processing unit 502 of the multispectral image sensor unit 500 in FIG. 17 may include the focus processing unit 755 illustrated in FIG. 24 in a stage after the image processing unit 554. Additionally, in the image processing illustrated in FIG. 19, the focus processing unit 755 may perform the processing of step S755 in FIG. 26 after the processing of step S555.

Combination of First Embodiment, Second Embodiment, and Third Embodiment

Of course, the present technique described above in the first embodiment, the present technique described above in the second embodiment, and the present technique described above in the third embodiment may be applied in combination with each other.

6. Supplement

<Computer>

The series of processing described above can be executed by hardware, or can be executed by software. When the series of processing is executed by software, a program that constitutes the software is installed on a computer. Here, the computer includes, for example, a computer built in dedicated hardware and a general-purpose personal computer in which various programs are installed to be able to execute various functions.

Figure 27:
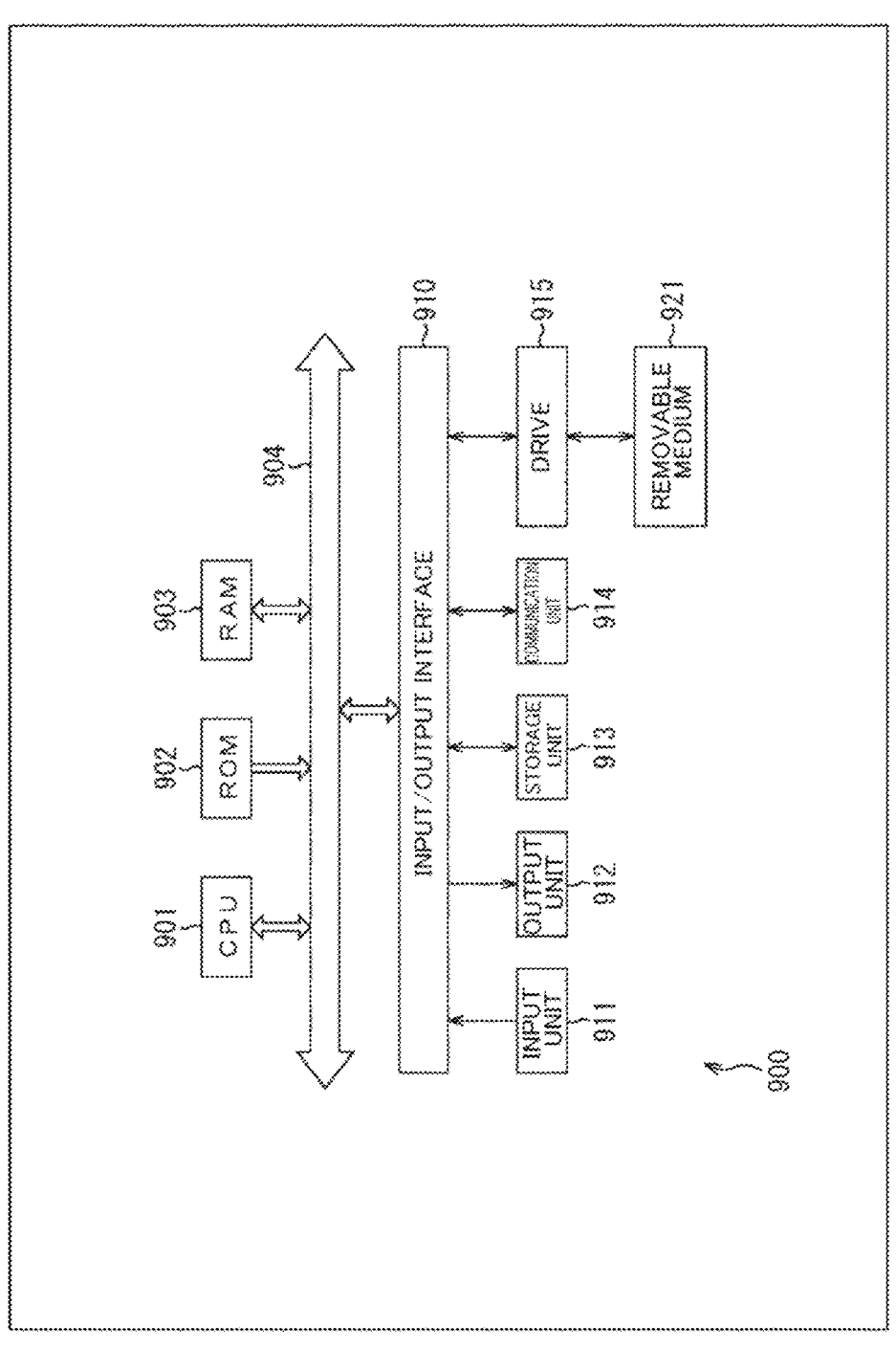
FIG. 27 is a block diagram illustrating an example of the main configuration of a computer.

FIG. 27 is a block diagram illustrating an example of hardware configuration of a computer that executes the series of processing described above according to a program.

In a computer 900 illustrated in FIG. 27, a Central Processing Unit (CPU) 901, Read Only Memory (ROM) 902, and Random Access Memory (RAM) 903 are connected to each other by a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, and non-volatile memory. The communication unit 914 includes, for example, a network interface. The drive 915 drives a removable medium 921 such as a magnetic disk, an optical disc, a magneto-optical disk, semiconductor memory, or the like.

In the computer that has the above configuration, for example, the CPU 901 executes the above-described series of processes by loading a program stored in the storage unit 913 to the RAM 903 via the input/output interface 910 and the bus 904 and executing the program. Data and the like necessary for the CPU 901 to execute the various kinds of processing is also stored as appropriate in the RAM 903.

The program executed by the computer can be recorded in, for example, a removable medium 921 as a package medium or the like and provided in such a form. In this case, the program may be installed in the storage unit 913 via the input/output interface 910 by inserting the removable medium 921 into the drive 915.

Additionally, the program may also be provided via a wired or wireless transmission medium such as a local area network, the Internet, or digital satellite broadcasting. In this case, the program can be received by the communication unit 914 and installed in the storage unit 913.

In addition, this program can be installed in advance in the ROM 902, the storage unit 913, or the like.

Application of the Present Technique

The present technique can be applied to any desired configuration.

For example, the present technique can be applied in various electronic devices such as transmitters and receivers (e.g., television receivers and cellular phones) in satellite broadcasting, wired broadcasting such as cable TV, transmission on the Internet, transmission to terminals according to cellular communication, and the like, or devices (e.g., hard disk recorders and cameras) that record images in media such as an optical disk, a magnetic disk, and a flash memory or reproduce images from these storage media.

Additionally, for example, the present technique can be implemented as a configuration of a part of a device such as a processor (e.g., a video processor) of a system large scale integration (LSI) circuit, a module (e.g., a video module) using a plurality of processors or the like, a unit (e.g., a video unit) using a plurality of modules or the like, or a set (e.g., a video set) with other functions added to the unit.

For example, the present technique can also be applied to a network system configured with a plurality of devices. The present technique may be implemented as, for example, cloud computing for processing shared among a plurality of devices via a network. For example, the present technique may be implemented in a cloud service that provides services regarding images (moving images) to any terminals such as a computer, an audio visual (AV) device, a mobile information processing terminal, and an Internet-of-Things (IoT) device or the like.

Note that, in the present specification, "system" means a set of a plurality of constituent elements (devices, modules (components), or the like), and it does not matter whether or not all the constituent elements are provided in the same housing. Therefore, a plurality of devices contained in separate housings and connected over a network, and one device in which a plurality of modules are contained in one housing, are both "systems".

Fields and Applications in which Present Technique is Applicable

A system, a device, a processing unit, or the like in which the present technique is applied can be used in any field, such as, for example, transportation, medical care, crime prevention, agriculture, livestock industry, mining, beauty, factories, home appliances, weather, nature monitoring, and the like. The application of the present technique can also be implemented as desired.

For example, the present technique can be applied in systems and devices used for providing content for viewing and the like. In addition, for example, the present technique can be applied in systems and devices used for transportation, such as traffic condition monitoring and autonomous driving control. Furthermore, for example, the present technique can be applied in systems and devices used for security. In addition, for example, the present technique can be applied to systems and devices used for automatically controlling machines and the like. Furthermore, for example, the present technique can be applied in systems and devices used for the agriculture and livestock industries. In addition, the present technique can also be applied, for example, in systems and devices for monitoring natural conditions such as volcanoes, forests, oceans, wildlife, and the like. Furthermore, for example, the present technique can be applied in systems and devices used for sports.

Others

The embodiments of the present technique are not limited to the above-described embodiments, and various modifications can be made without departing from the essential spirit of the present technique.

For example, configurations described as one device (or one processing unit) may be divided to be configured as a plurality of devices (or processing units). Conversely, configurations described as a plurality of devices (or processing units) in the foregoing may be collectively configured as one device (or one processing unit). Configurations other than those described above may of course be added to the configuration of each device (or each processing unit). Furthermore, part of the configuration of one device (or one processing unit) may be included in the configuration of another device (or another processing unit) as long as the configuration or operation of the entire system is substantially the same.

Additionally, for example, the program described above may be executed on any device. In this case, the device may have necessary functions (function blocks and the like) and may be capable of obtaining necessary information.

Additionally, for example, each step of a single flowchart may be executed by a single device, or may be executed cooperatively by a plurality of devices. Furthermore, if a single step includes a plurality of processes, the plurality of processes may be executed by a single device or shared by a plurality of devices. In other words, the plurality of kinds of processing included in the single step may be executed as processing for a plurality of steps. Conversely, processing described as a plurality of steps may be collectively executed as a single step.

Further, the program to be executed by a computer may have the following features. For example, the processing of steps described in the program may be executed in chronological order according to the order described in the present specification. Further, the processing of some steps described in the program may be executed in parallel. Furthermore, the processing of steps described in the program may be individually executed at the necessary timing, such as when called. That is, as long as no contradiction arises, the processing steps may be executed in an order different from the order described above. Additionally, the processing of some steps described in this program may be executed in parallel with the processing of another program. Furthermore, the processing of steps described in this program may be executed in combination with the processing of another program.

Additionally, for example, the multiple techniques related to the present technique can be implemented independently on their own, as long as no contradictions arise. Of course, any number of modes of the present technique may be used in combination. For example, part or all of the present technique described in any of the embodiments may be implemented in combination with part or all of the present technique described in the other embodiments. Furthermore, part or all of any of the above-described modes of the present technique may be implemented in combination with other techniques not described above.

The present technology can also be configured as follows.

(1) An image processing device including:

a reconfiguring unit that, by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, generates a polarization angle characteristic reconfiguration image constituted by pixel values of the pixels that have detected the incident light for which characteristic values of at least the polarization angle characteristic are the same; and an encoding unit that encodes the polarization angle characteristic reconfiguration image.

(2) The image processing device according to (1), wherein the optical characteristics further include a transmission wavelength characteristic that is a wavelength characteristic of the incident light.

(3) The image processing device according to (2), wherein the reconfiguring unit generates a transmission wavelength characteristic reconfiguration image constituted by pixel values of the pixels that have detected the incident light for which characteristic values of the transmission wavelength characteristic are the same by reconfiguring the RAW image according to the transmission wavelength characteristic, and generates the polarization angle characteristic reconfiguration image by reconfiguring the transmission wavelength characteristic reconfiguration image according to the polarization angle characteristic.

(4) The image processing device according to (2) or (3), wherein the encoding unit encodes a plurality of the polarization angle characteristic reconfiguration images in an order based on characteristic values of the transmission wavelength characteristic.

(5) The image processing device according to any one of (2) to (4), wherein the encoding unit encodes the polarization angle characteristic reconfiguration image using prediction that utilizes intra-image correlation or inter-image correlation.

(6) The image processing device according to any one of (2) to (5), wherein the reconfiguring unit generates a transmission wavelength characteristic grid point reconfiguration image constituted by pixel values of the pixels that have detected the incident light for which characteristic values of the transmission wavelength characteristic are the same and that have same positions in a row direction or a column direction of the pixel array by reconfiguring the RAW image according to the transmission wavelength characteristic and the positions of the pixels, and generates the polarization angle characteristic reconfiguration image by reconfiguring the transmission wavelength characteristic grid point reconfiguration image according to the polarization angle characteristic.

(7) The image processing device according to (6), wherein the encoding unit encodes a plurality of the polarization angle characteristic reconfiguration images in an order based on characteristic values of the transmission wavelength characteristic.

(8) The image processing device according to any one of (1) to (7), wherein by reconfiguring the RAW image according to intra-block positions that are pixel positions within a pixel block constituted by a predetermined number of the pixels having a plurality of types of light reception sensitivities, the reconfiguring unit generates an intra-block position reconfiguration image constituted by pixel values of the pixels having same ones of the intra-block positions, and generates the polarization angle characteristic reconfiguration image by reconfiguring the intra-block reconfiguration image according to the polarization angle characteristic.

(9) The image processing device according to (8), wherein the encoding unit encodes a plurality of the polarization angle characteristic reconfiguration images in an order based on the light reception sensitivities.

(10) An image processing method including:

generating, by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, a polarization angle characteristic reconfiguration image constituted by pixel values of the pixels that have detected the incident light for which characteristic values of at least the polarization angle characteristic are the same; and encoding the polarization angle characteristic reconfiguration image generated.

(11) An image processing device including:

a decoding unit that, by decoding encoded data, generates a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and a development processing unit that performs development processing on the polarization angle characteristic reconfiguration image.

(12) The image processing device according to (11), wherein the optical characteristics further include a transmission wavelength characteristic that is a wavelength characteristic of the incident light.

(13) The image processing apparatus according to (12), further including:

a reconfiguring unit that, according to the polarization angle characteristic, reconfigures the polarization angle characteristic reconfiguration image that has been obtained by the decoding unit decoding the encoded data and that has been reconfigured according to optical characteristics including the polarization angle characteristic and the transmission wavelength characteristic, wherein the development processing unit performs the development processing on the polarization angle characteristic reconfiguration image reconfigured by the reconfiguring unit.

(14) The image processing device according to any one of (11) to (13), further including:

an image processing unit that performs processing for reducing noise on a post-development image generated by the development processing unit performing the development processing on the polarization angle characteristic reconfiguration image.

(15) The image processing device according to any one of (11) to (14), further including:

an image processing unit that enlarges or reduces a post development image generated by the development processing unit performing the development processing on the polarization angle characteristic reconfiguration image.

(16) The image processing device according to any one of (11) to (15), wherein the optical characteristics further include a transmission wavelength characteristic that is a wavelength characteristic of the incident light, and the polarization angle characteristic reconfiguration image is an image obtained by reconfiguring the RAW image according to the transmission wavelength characteristic and the positions of the pixels, and further reconfiguring the reconfigured RAW image according to the polarization angle characteristic.

(17) The image processing device according to (16), further including:

a wavelength expansion processing unit that performs wavelength expansion processing on a post-development image generated by the development processing unit performing the development processing on the polarization angle characteristic reconfiguration image.

(18) The image processing device according to any one of (11) to (17), wherein the polarization angle characteristic reconfiguration image is an image obtained by reconfiguring the RAW image according to intra-block positions that are pixel positions within a pixel block constituted by a predetermined number of the pixels having a plurality of types of light reception sensitivities, and further reconfiguring the reconfigured RAW image according to the polarization angle characteristic.

(19) The image processing device according to (18), further including:

a focus processing unit that performs focus processing based on a post-development image generated by the development processing unit performing the development processing on the polarization angle characteristic reconfiguration image.

(20) An image processing method including:

generating, by decoding encoded data, a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and performing development processing on the polarization angle characteristic reconfiguration image generated.

(31) An image processing device including:

a reconfiguring unit that, by reconfiguring a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, generates a transmission wavelength characteristic-grid point reconfiguration image constituted by pixel values of the pixels that have detected the incident light for which characteristic values of the transmission wavelength characteristic are the same and that have same positions in a row direction or a column direction of the pixel array; and an encoding unit that encodes the transmission wavelength characteristic-grid point reconfiguration image.

(32) The image processing device according to (31), wherein the encoding unit encodes a plurality of the transmission wavelength characteristic-grid point reconfiguration image in an order based on characteristic values of the transmission wavelength characteristic.

(33) The image processing device according to (31) or (32), wherein the encoding unit encodes the transmission wavelength characteristic-grid point reconfiguration image using prediction that utilizes intra-image correlation or inter-image correlation.

(34) The image processing device according to any one of (31) to (33), wherein by reconfiguring the RAW image according to intra-block positions that are pixel positions within a pixel block constituted by a predetermined number of the pixels having a plurality of types of light reception sensitivities, the reconfiguring unit generates an intra-block position reconfiguration image constituted by pixel values of the pixels having same ones of the intra-block positions, and generates the transmission wavelength characteristic grid point reconfiguration image by reconfiguring the intra-block reconfiguration image according to the transmission wavelength characteristic and the positions of the pixels.

(35) The image processing device according to (34), wherein the encoding unit encodes a plurality of the transmission wavelength characteristic-grid point reconfiguration images in an order based on the light reception sensitivities.

(36) An image processing method including:

generating, by reconfiguring a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, a transmission wavelength characteristic-grid point reconfiguration image constituted by pixel values of the pixels that have detected the incident light for which characteristic values of the transmission wavelength characteristic are the same and that have same positions in a row direction or a column direction of the pixel array; and encoding the transmission wavelength characteristic-grid point reconfiguration image generated.

(41) An image processing device including:

a decoding unit that, by decoding encoded data, generates a transmission wavelength characteristic-grid point reconfiguration image, in which a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, is reconfigured, the transmission wavelength characteristic-grid point reconfiguration image being constituted by pixel values of the pixels that have detected the incident light for which characteristic values of the transmission wavelength characteristic are the same and that have same positions in a row direction or a column direction of the pixel array; and a development processing unit that performs development processing on the transmission wavelength characteristic-grid point reconfiguration image.

(42) The image processing device according to (41), further including:

an image processing unit that performs image processing on a post-development image generated by the development processing unit performing the development processing on the transmission wavelength characteristic-grid point reconfiguration image.

(43) The image processing device according to (42), wherein the image processing unit performs processing for reducing noise on the post-development image.

(44) The image processing device according to (42) or (43), wherein the image processing unit enlarges or reduces the post-development image.

(45) The image processing device according to any one of (41) to (44), further including:

a wavelength expansion processing unit that performs wavelength expansion processing on a post-development image generated by the development processing unit performing the development processing on the transmission wavelength characteristic-grid point reconfiguration image.

(46) The image processing device according to any one of (41) to (45), wherein the transmission wavelength characteristic-grid point reconfiguration image is an image obtained by reconfiguring the RAW image according to intra-block positions that are pixel positions within a pixel block constituted by a predetermined number of the pixels having a plurality of types of light reception sensitivities, and further reconfiguring the reconfigured RAW image according to the transmission wavelength characteristic and the positions of the pixels.

(47) The image processing device according to (46), further including:

a focus processing unit that performs focus processing based on a post-development image generated by the development processing unit performing the development processing on the transmission wavelength characteristic-grid point reconfiguration image.

(48) An image processing method including:

generating, by decoding encoded data, a transmission wavelength characteristic-grid point reconfiguration image, in which a RAW image, the RAW image being an output of a sensor having a pixel array constituted by a plurality of types of pixels each detecting incident light having a different wavelength characteristic, according to a transmission wavelength characteristic that is the wavelength characteristic of the incident light and positions of the pixels, is reconfigured, the transmission wavelength characteristic-grid point reconfiguration image being constituted by pixel values of the pixels that have detected the incident light for which characteristic values of the transmission wavelength characteristic are the same and that have same positions in a row direction or a column direction of the pixel array; and performing development processing on the transmission wavelength characteristic-grid point reconfiguration image generated.

(51) An image processing device including:

a reconfiguring unit that, by reconfiguring a RAW image, the RAW image being an output of a sensor having a pixel array constituted by a plurality of types of pixels each having different light reception sensitivities, according to intra-block positions that are pixel positions within a pixel block constituted by a predetermined number of the pixels including the plurality of types of pixels, generates an intra-block position reconfiguration image constituted by pixel values of the pixels having same intra-block positions; and an encoding unit that encodes the intra-block position reconfiguration image.

(52) The image processing device according to (51), wherein the encoding unit encodes a plurality of the intra-block position reconfiguration image in an order based on the light reception sensitivities.

(53) The image processing device according to (51) or (52), wherein the encoding unit encodes the intra-block position reconfiguration image using prediction that utilizes intra-image correlation or inter-image correlation.

(54) An image processing method including:

generating, by reconfiguring a RAW image, the RAW image being an output of a sensor having a pixel array constituted by a plurality of types of pixels each having different light reception sensitivities, according to intra-block positions that are pixel positions within a pixel block constituted by a predetermined number of the pixels including the plurality of types of pixels, an intra-block position reconfiguration image constituted by pixel values of the pixels having same intra-block positions; and encoding the intra-block position reconfiguration image generated.

(61) An image processing device including:

a decoding unit that, by decoding encoded data, generates an intra-block position reconfiguration image in which a RAW image, the RAW image being an output of a sensor having a pixel array constituted by a plurality of types of pixels each having different light reception sensitivities, is reconfigured according to intra-block positions that are pixel positions within a pixel block constituted by a predetermined number of the pixels including the plurality of types of pixels, the intra-block position reconfiguration image being constituted by pixel values of the pixels having same intra-block positions; and a development processing unit that performs development processing on the intra-block position reconfiguration image.

(62) The image processing device according to (61), further including:

an image processing unit that performs image processing on a post-development image generated by the development processing unit performing the development processing on the intra-block position reconfiguration image.

(63) The image processing device according to (62), wherein the image processing unit performs processing for reducing noise on the post-development image.

(64) The image processing device according to (62) or (63), wherein the image processing unit enlarges or reduces the post-development image.

(65) The image processing device according to any one of (61) to (64), further including:

a focus processing unit that performs focus processing based on a post-development image generated by the development processing unit performing the development processing on the intra-block reconfiguration image.

(66) An image processing method including:

generating, by decoding encoded data, an intra-block position reconfiguration image in which a RAW image, the RAW image being an output of a sensor having a pixel array constituted by a plurality of types of pixels each having different light reception sensitivities, is reconfigured according to intra-block positions that are pixel positions within a pixel block constituted by a predetermined number of the pixels including the plurality of types of pixels, the intra-block position reconfiguration image being constituted by pixel values of the pixels having same intra-block positions; and performing development processing on the intra-block position reconfiguration image generated.

REFERENCE SIGNS LIST

300 Polarization sensor unit
301 Detection unit
302 Image processing unit
311 Polarization sensor
312 Reconfiguring unit
313 Reconfiguration image encoding unit
314 Transmission unit
321 Transmission wavelength characteristic reconfiguring unit
322 Polarization angle characteristic reconfiguring unit
331 Encoding unit
351 Reception unit
352 Reconfiguration image decoding unit
353 Polarization angle characteristic reconfiguring unit
354 Development processing unit
355 Image processing unit
361 Decoding unit
500 Multispectral image sensor unit
501 Detection unit
502 Image processing unit
511 Multispectral image sensor
512 Reconfiguring unit
513 Reconfiguration image encoding unit
514 Transmission unit
531 Encoding unit
551 Reception unit
552 Reconfiguration image decoding unit
553 Development processing unit
554 Image processing unit
555 Wavelength expansion processing unit
561 Decoding unit
700 Image plane phase detection AF image sensor unit
701 Detection unit
702 Image processing unit
711 Image sensor
712 Reconfiguring unit
713 Reconfiguration image encoding unit
714 Transmission unit
731 Encoding unit
751 Reception unit
752 Reconfiguration image decoding unit
753 Development processing unit
754 Image processing unit
755 Focus processing unit

The invention claimed is:

1. An image processing device comprising:
a memory storing a program, and

at least one processor configured to execute the program to perform operations comprising:

reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light and a transmission wavelength characteristic that is a wavelength characteristic of the incident light;

generating a polarization angle characteristic reconfiguration image constituted by pixel values of the pixels that have detected the incident light for which characteristic values of at least the polarization angle characteristic are the same;

generating a transmission wavelength characteristic reconfiguration image constituted by pixel values of the pixels that have detected the incident light for which characteristic values of the transmission wavelength characteristic are the same by reconfiguring the RAW image according to the transmission wavelength characteristic;

generating the polarization angle characteristic reconfiguration image by reconfiguring the transmission wavelength characteristic reconfiguration image according to the polarization angle characteristic; and encoding the polarization angle characteristic reconfiguration image.

2. An image processing device comprising:
a memory storing a program, and
at least one processor configured to execute the program to perform operations comprising:

reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light and a transmission wavelength characteristic that is a wavelength characteristic of the incident light;

generating a polarization angle characteristic reconfiguration image constituted by pixel values of the pixels that have detected the incident light for which characteristic values of at least the polarization angle characteristic are the same; and encoding a plurality of the polarization angle characteristic reconfiguration images in an order based on characteristic values of the transmission wavelength characteristic.

3. An image processing device, comprising:
a memory storing a program, and
at least one processor configured to execute the program to perform operations comprising:

reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light and a transmission wavelength characteristic that is a wavelength characteristic of the incident light;

generating a polarization angle characteristic reconfiguration image constituted by pixel values of the pixels that have detected the incident light for which characteristic values of at least the polarization angle characteristic are the same; and encoding the polarization angle characteristic reconfiguration image using prediction that utilizes intra-image correlation or inter-image correlation.

4. An image processing device comprising:

a memory storing a program, and at least one processor configured to execute the program to perform operations comprising:

reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light and a transmission wavelength characteristic that is a wavelength characteristic of the incident light;

generating a polarization angle characteristic reconfiguration image constituted by pixel values of the pixels that have detected the incident light for which characteristic values of at least the polarization angle characteristic are the same; and generating a transmission wavelength characteristic grid point reconfiguration image constituted by pixel values of the pixels that have detected the incident light for which characteristic values of the transmission wavelength characteristic are the same and that have same positions in a row direction or a column direction of the pixel array by reconfiguring the RAW image according to the transmission wavelength characteristic and the positions of the pixels;

generating the polarization angle characteristic reconfiguration image by reconfiguring the transmission wavelength characteristic grid point reconfiguration image according to the polarization angle characteristic; and encoding the polarization angle characteristic reconfiguration image.

5. The image processing device according to claim 4, wherein the operations further comprising:

encoding a plurality of the polarization angle characteristic reconfiguration images in an order based on characteristic values of the transmission wavelength characteristic.

6. An image processing device comprising:

a memory storing a program, and at least one processor configured to execute the program to perform operations comprising:

reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light;

generating a polarization angle characteristic reconfiguration image constituted by pixel values of the pixels that have detected the incident light for which characteristic values of at least the polarization angle characteristic are the same;

by reconfiguring the RAW image according to intra-block positions that are pixel positions within a pixel block constituted by a predetermined number of the pixels having a plurality of types of light reception sensitivities, generating an intra-block position reconfiguration image constituted by pixel values of the pixels having same ones of the intra-block positions;

generating the polarization angle characteristic reconfiguration image by reconfiguring the intra-block reconfiguration image according to the polarization angle characteristic; and encoding the polarization angle characteristic reconfiguration image.

7. The image processing device according to claim 6, wherein the operations further comprise:

encoding a plurality of the polarization angle characteristic reconfiguration images in an order based on the light reception sensitivities.

8. An image processing device comprising:

a memory storing a program, and at least one processor configured to execute the program to perform operations comprising:

decoding encoded data to generate a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic and a transmission wavelength characteristic that is a wavelength characteristic of the incident light, according to the different optical characteristics, and the polarization angle characteristic reconfiguration image being constituted by pixel values of the pixels that have detected the incident light for which characteristic values of at least the polarization angle characteristic are the same;

according to the polarization angle characteristic, reconfiguring the polarization angle characteristic reconfiguration image that has been obtained by decoding the encoded data and that has been reconfigured according to optical characteristics including the polarization angle characteristic and the transmission wavelength characteristic;

performing development processing on the polarization angle characteristic reconfiguration image after it is subjected to the reconfiguring.

9. An image processing device comprising:

a memory storing a program, and at least one processor configured to execute the program to perform operations comprising:

decoding encoded data to generate a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same;

performing development processing on the polarization angle characteristic reconfiguration image; and performing processing for reducing noise on a post-development image generated by performing the development processing on the polarization angle characteristic reconfiguration image.

10. An image processing device comprising:
a memory storing a program, and
at least one processor configured to execute the program to perform operations comprising:
decoding encoded data to generate a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same;
performing development processing on the polarization angle characteristic reconfiguration image; and
enlarging or reducing a post-development image generated by performing the development processing on the polarization angle characteristic reconfiguration image.

11. An image processing device comprising:
a memory storing a program, and
at least one processor configured to execute the program to perform operations comprising:
decoding encoded data to generate a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and
performing development processing on the polarization angle characteristic reconfiguration image, wherein
the optical characteristics further include a transmission wavelength characteristic that is a wavelength characteristic of the incident light, and the polarization angle characteristic reconfiguration image is an image obtained by reconfiguring the RAW image according to the transmission wavelength characteristic and positions of the pixels, and further reconfiguring the reconfigured RAW image according to the polarization angle characteristic.

12. The image processing device according to claim 11, wherein the operations further comprise:
performing wavelength expansion processing on a post-development image generated by performing the development processing on the polarization angle characteristic reconfiguration image.

13. An image processing device comprising:
a memory storing a program, and
at least one processor configured to execute the program to perform operations comprising:
decoding encoded data to generate a polarization angle characteristic reconfiguration image, the polarization angle characteristic reconfiguration image being obtained by reconfiguring a RAW image, the RAW image being an output of a sensor having a pixel array constituted by a plurality of types of pixels each detecting incident light having different optical characteristics including at least a polarization angle characteristic, according to the optical characteristics including at least the polarization angle characteristic of the incident light, and the polarization angle characteristic reconfiguration image being constituted by pixel values of the pixels that have detected the incident light for which characteristic values of at least the polarization angle characteristic are the same; and
performing development processing on the polarization angle characteristic reconfiguration image,
wherein the polarization angle characteristic reconfiguration image is an image obtained by reconfiguring the RAW image according to intra-block positions that are pixel positions within a pixel block constituted by a predetermined number of the pixels having a plurality of types of light reception sensitivities, and further reconfiguring the reconfigured RAW image according to the polarization angle characteristic.

14. The image processing device according to claim 13, wherein the operations further comprise:
performing focus processing based on a post-development image generated by performing the development processing on the polarization angle characteristic reconfiguration image.

* * * * *